United States Patent
Takabayashi et al.

(10) Patent No.: US 11,332,141 B2
(45) Date of Patent: May 17, 2022

(54) PATH ESTIMATION DEVICE AND PATH ESTIMATION METHOD

(71) Applicant: Mitsubishi Electric Corporation, Tokyo (JP)

(72) Inventors: Yuki Takabayashi, Tokyo (JP); Yasushi Obata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 133 days.

(21) Appl. No.: 16/616,550

(22) PCT Filed: Jun. 20, 2017

(86) PCT No.: PCT/JP2017/022683
§ 371 (c)(1),
(2) Date: Nov. 25, 2019

(87) PCT Pub. No.: WO2018/235159
PCT Pub. Date: Dec. 27, 2018

(65) Prior Publication Data
US 2021/0163010 A1    Jun. 3, 2021

(51) Int. Cl.
*B60W 30/09* (2012.01)
*G08G 1/16* (2006.01)
*B60W 30/18* (2012.01)
*G01C 21/34* (2006.01)

(52) U.S. Cl.
CPC ...... *B60W 30/18163* (2013.01); *B60W 30/09* (2013.01); *G01C 21/3453* (2013.01); *G08G 1/16* (2013.01); *B60W 2554/404* (2020.02)

(58) Field of Classification Search
CPC .......... B60W 30/18163; B60W 30/09; B60W 2554/404; B60W 2554/802; B60W 50/06; B60W 2050/065; B60W 2554/804; B60W 60/0011; B60W 40/02; G01C 21/3453; G08G 1/16; G08G 1/166
See application file for complete search history.

(56) References Cited

U.S. PATENT DOCUMENTS

2018/0357772 A1* 12/2018 Takemura .......... G06K 9/00369
2020/0192383 A1*  6/2020 Nath ..................... B62D 6/00

FOREIGN PATENT DOCUMENTS

JP        2016-038717 A        3/2016
JP        2016038717 A    *    3/2016

OTHER PUBLICATIONS

English_Translation_JP2016/038717A (Year: 2016).*
Yoshiaki Kuwata et al., "Real-Time Motion Planning With Applications to Autonomous Urban Driving," IEEE Transactions on Control Systems Technology, Sep. 2009, pp. 1105-1118, vol. 17, No. 5.
International Search Report of PCT/JP2017/022683 dated Sep. 19, 2017.

* cited by examiner

*Primary Examiner* — Peter D Nolan
*Assistant Examiner* — Ashley L Redhead, Jr.
(74) *Attorney, Agent, or Firm* — Sughrue Mion, PLLC; Richard C. Turner

(57) ABSTRACT

A plurality of candidate estimated paths (301) for a vehicle (100) to travel to an intermediate destination (300) while avoiding a moving object present by estimation time is generated depending on cost information of lanes (200, 201), and an estimated path selected from the plurality of candidate estimated paths (301) is set as a path of the vehicle (100) for each estimation time.

15 Claims, 11 Drawing Sheets

Time Margin for Overtaking

Area in Road Width Direction

Area in Road Width Direction

Area in Road Width Direction

PATH ESTIMATION DEVICE AND PATH ESTIMATION METHOD

CROSS REFERENCE TO RELATED APPLICATIONS

This application is a National Stage of International Application No. PCT/JP2017/022683 filed Jun. 20, 2017.

TECHNICAL FIELD

The present invention relates to a path estimation device and a path estimation method for estimating a path to be traveled on by a vehicle.

BACKGROUND ART

In recent years, a technique for estimating a path for avoiding collisions of vehicles has been desired in the field of driving assist systems for vehicles. For example, there is a technique to prevent a collision between an obstacle and a vehicle by detecting the position of an obstacle present around the vehicle using a sensor mounted on the vehicle and controlling the vehicle on the basis of the relative distance or relative velocity of the obstacle and the vehicle. Also proposed is a technique to cause a vehicle to travel along a path to a destination by recognizing the environment around the vehicle by sensors mounted on the vehicle and performing steering wheel operation or brake operation automatically without intervention by the driver.

As an algorithm for estimation of a path for a vehicle, a rapidly-exploring random tree (RRT) is proposed. The RRT grows candidate paths called a tree randomly generated in free space, thereby generating a path leading to a destination.

Moreover, in RRT, a path can be efficiently generated by preferentially growing a low-cost tree. Setting high cost for the position of an obstacle present around a vehicle is likely to result in generation of a path for avoiding the obstacle.

In this manner, in conventional path planning algorithms represented by the RRT, a destination is set, a plurality of candidate paths which can lead to the destination while avoiding an obstacle is calculated, and a candidate having the lowest cost is selected as a travel path of the vehicle.

In a case where the RRT algorithm is applied to an automatic driving vehicle, a position that the vehicle arrives a few seconds later is set as the destination, and candidate paths are sequentially generated to determine a path to the final destination. However, there is a possibility that when changing lanes is performed to reach the destination of a few seconds later, traffic regulations or structural constraints of the road may prevent the vehicle from returning to the lane leading to the final destination.

For example, changing lanes is performed when a position ahead in an adjacent lane is selected as the destination for the vehicle to reach several seconds later even in a case where the traffic ahead in the lane on which the vehicle is traveling is congested as compared to the traffic ahead in the adjacent lane. In this case, since the traffic ahead in the original lane is congested, there is a high possibility that the vehicle cannot return to the original lane. In addition, when a position on a branch is selected as the destination for the vehicle to arrive several seconds later, the vehicle changes its course to the branch and thus becomes unable to return to the original lane.

In a case where the driver manually drives the vehicle, when the traffic ahead in the lane is congested, the driver judges that changing lanes for overtaking of a preceding vehicle will make it difficult to return to the original lane even when the speed of the preceding vehicle is slow, and thus the driver drives to follow the preceding vehicle without changing lanes.

In conventional path planning algorithms, when the speed of a preceding vehicle is slow, it is likely that a path for overtaking the preceding vehicle is selected.

In addition, by extending the time to arrival at the final destination ahead, it is possible to compare the costs of candidate paths including branches to select a path; however, this generates a large number of candidate paths, which disadvantageously increases the calculation load.

Meanwhile, for example, Patent Literature 1 describes a device which sets, as an overtaking point, a candidate overtaking point having a distance between a preceding vehicle and a vehicle ahead of the preceding vehicle after estimated arrival time, which is greater than or equal to a set distance from among a plurality of candidate overtaking points set for a target path. Since a candidate passing point is a destination where the vehicle arrives several seconds later, the position having a distance between the preceding vehicle and the vehicle ahead of the preceding vehicle after the estimated arrival time, which is greater than or equal to the set distance is selected as the destination in the device described in Patent Literature 1. As a result, if the traffic ahead in the lane is crowded, no overtaking of the preceding vehicle is performed.

CITATION LIST

Patent Literature

Patent Literature 1: JP 2016-38717 A

SUMMARY OF INVENTION

Technical Problem

In the device described in Patent Literature 1, the position for performing overtaking is determined on the basis of the position of a preceding vehicle and a vehicle ahead of the preceding vehicle in the lane in which the vehicle is traveling.

However, in practice, a path on which the vehicle should travel cannot be properly selected unless consideration is made not only for the lane on which the vehicle is traveling but also the situation around the vehicle including branches and adjacent lanes.

For example, changing lanes for overtaking cannot be performed when the traffic in an adjacent lane after estimated arrival time is congested, even in the case where the position, having a distance between the preceding vehicle and the vehicle ahead of the preceding vehicle after estimated arrival time, which is greater than or equal to a set distance, is set as the overtaking point.

Moreover, since the path is selected in consideration of only whether the preceding vehicle can be overtaken in the device described in Patent Literature 1, a path of the vehicle cannot be appropriately selected when overtaking cannot be performed.

This invention solves the above disadvantages, and an object of the invention is to obtain a path estimation device and a path estimation method capable of estimating a path for a vehicle depending on the situation around the vehicle.

Solution to Problem

A path estimation device according to the present invention includes an estimation processing unit, a first calculation unit, a second calculation unit, a determination unit, and an estimated path setting unit. The estimation processing unit calculates an estimated position of a moving object for each of time steps up to estimation time which is sequentially set from the current time on the basis of information of the state of the moving object present around the vehicle. The first calculation unit calculates the time margin for the vehicle traveling on a target path to overtake a preceding vehicle on the basis of information of the state of the vehicle, target path information to the final destination, and the information of the state of each of the preceding vehicle and a vehicle ahead of the preceding vehicle. The second calculation unit calculates weighting for the cost of each of the lane on which the vehicle is traveling and an adjacent lane and performs weighting depending on the length of the time margin calculated by the first calculation unit. The determination unit determines an intermediate destination, which is the position of the vehicle at estimation time, for each estimation time. The estimated path setting unit generates a plurality of candidate estimated paths, which leads the vehicle to the intermediate destination while avoiding moving objects present by the estimation time, depending on cost information of lanes on the basis of cost information of the lanes weighted by the second calculation unit, position information of the intermediate destination determined by the determination unit, and estimated position information of the moving object calculated by the estimation processing unit, and sets an estimated path selected from the plurality of candidate estimated paths as a path of the vehicle for each estimation time.

Advantageous Effects of Invention

According to the invention, a plurality of candidate estimated paths on which a vehicle travels to an intermediate destination is generated depending on the weighting for the costs of lanes while a moving object present by estimation time is avoided, and an estimated path selected from the plurality of candidate estimated paths is set as a path of the vehicle for each estimation time. As a result, the path of the vehicle can be estimated depending on the situation around the vehicle.

DESCRIPTION OF EMBODIMENTS

To describe the present invention further in detail, embodiments for carrying out the invention will be described below with reference to the accompanying drawings.

First Embodiment

Figure 1:
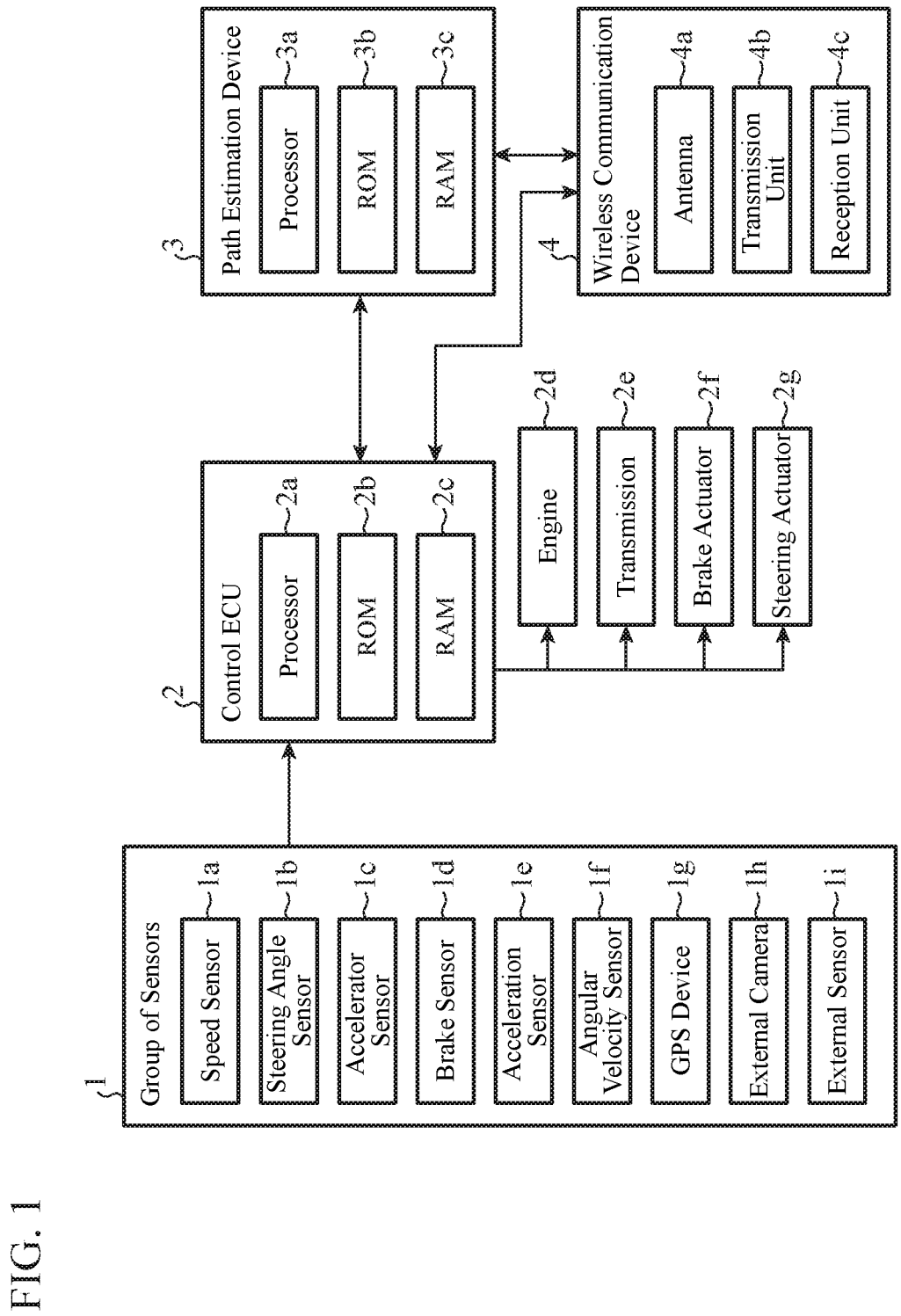
FIG. 1 is a block diagram illustrating a hardware configuration according to a first embodiment of the present invention.

FIG. 1 is a block diagram illustrating a hardware configuration according to a first embodiment of the present invention. A vehicle in the first embodiment includes, for example, a group of sensors 1 including various sensors, a control electronic control unit (ECU) 2, a path estimation device 3, and a wireless communication device 4 as illustrated in FIG. 1. The control ECU 2 is capable of controlling hardware as a control target inside the vehicle on the basis of information detected by the group of sensors 1.

The group of sensors 1 includes a sensor that detects information related to the state of a moving object such as a vehicle or a pedestrian present around the vehicle, and a sensor that detects information related to the state of the vehicle. The group of sensors 1 includes a speed sensor $1a$, a steering angle sensor $1b$, an accelerator sensor $1c$, a brake sensor $1d$, an acceleration sensor $1e$, an angular velocity sensor $1f$, a global positioning system (GPS) device $1g$, an external camera $1h$, and an external sensor $1i$.

Note that the information of the state of a detection target includes at least the position and the moving speed of the detection target, and in a case where the detection target is a vehicle, information such as the acceleration, the amount of operation of the steering wheel, the amount of operation of the accelerator, and the amount of operation of the brake may be included.

The speed sensor $1a$ detects the speed of the vehicle and outputs an electric signal (speed pulse) corresponding to the wheel speed to the control ECU 2.

The steering angle sensor $1b$ detects the steering angle of the vehicle, and outputs an electric signal corresponding to the steering angle to the control ECU 2.

The accelerator sensor 1e detects the accelerator position angle of a vehicle, that is, the amount of operation of the accelerator pedal. The operation amount information of the accelerator pedal is output from the accelerator sensor 1c to the control ECU 2.

The brake sensor 1d detects the amount of operation of the brake pedal, and outputs the operation amount information of the brake pedal to the control ECU 2.

The acceleration sensor 1e detects the acceleration of the vehicle and includes, for example, a three-axis acceleration sensor. The acceleration information of the vehicle detected by the acceleration sensor 1e is output to the control ECU 2.

The angular velocity sensor 1f detects the angular velocity (gyro) of the vehicle.

The angular velocity information detected by the angular velocity sensor 1f is output to the control ECU 2.

The control ECU 2 is capable of detecting the turning speed of the vehicle on the basis of the angular velocity information detected by the angular velocity sensor 1f.

The GPS device 1g detects the position of the vehicle using radio waves transmitted by GPS satellites.

The position coordinates (latitude and longitude) of the vehicle detected by the GPS device 1g are output to the control ECU 2. The GPS device 1g may be further combined with, for example, an inertial measurement unit (IMU). The position of the vehicle is detected by the GPS device 1g, and the posture and the inclination of the vehicle are detected by the IMU.

The external camera 1h photographs the outside of the vehicle, and is implemented by, for example, an optical camera or an infrared camera. The photographed image photographed by the external camera 1h is output to the control ECU 2. The control ECU 2 executes detection and recognition of a detection target such as a pedestrian, a vehicle, or an obstacle around the vehicle on the basis of the photographed image input from the external camera 1h.

The control ECU 2 is capable of recognizing a white line of the road on which the vehicle is traveling from the photographed image of the external camera 1h.

The external sensor 1i detects the position and the moving speed of a moving object such as a vehicle or a pedestrian present around the vehicle, and can be implemented by, for example, a millimeter wave radar or a laser radar. The external sensor 1i outputs detection information of a moving object to the control ECU 2.

The control ECU 2 detects the position of the moving object and the distance between the vehicle and the moving object on the basis of the detection information of the moving object input from the external sensor 1i. Detection of the distance between the vehicle and the moving object around the vehicle and the position of the moving object may be performed by the control ECU 2, or may be performed by the external sensor 1i itself with a detection result obtained thereby output to the control ECU 2. Alternatively, the detection may be performed by the path estimation device 3.

The control ECU 2 has a function of controlling the entire vehicle. As illustrated in FIG. 1, the control ECU 2 includes a processor 2a, a read only memory (ROM) 2b, and a random access memory (RAM) 2c.

The processor 2a is a calculation processing circuit that performs various types of calculation processing in the control ECU 2, and is hardware called a processor, a calculation processing circuit, an electric circuit, a controller, and the like. The processor 2a includes a set of one or more calculation processing circuits. The processor 2a is capable of reading a program from the ROM 2b and deploying the program on the RAM 2c to execute calculation processing.

The ROM 2b is a non-volatile storage device for storing one or more programs.

The RAM 2c is a volatile storage device that the processor 2a uses as a deployment area for programs and various types of information.

The ROM 2b and the RAM 2c include, for example, a semiconductor storage device and may be called a memory as well.

Although the ROM 2b is illustrated as an exemplary storage device storing programs to be executed by the processor 2a, the storage device is not limited to this. For example, the storage device may be a nonvolatile large-capacity storage device called a storage such as a hard disk drive (HDD) or a solid state drive (SSD).

The storage devices and the storage may be collectively called a memory.

This also applies to the path estimation device 3 described later.

An engine 2d is a power source for driving the vehicle and generates power for rotating the wheels. The engine 2d can operate also by a command from the control ECU 2.

A transmission 2e transmits the power generated in the engine 2d to the wheels. The transmission 2e is capable of changing the torque transmitted to the wheels by changing gears upon a command from the control ECU 2.

A brake actuator 2f is a mechanism for operating the brake (decelerator) of the vehicle, and is capable of operating the brake in accordance with a command from the control ECU 2 to decelerate the vehicle.

The steering actuator 2g is a mechanism for operating the steering (steering device) of the vehicle, and is capable of controlling the steering in accordance with a command by the control ECU 2 to control the traveling direction of the vehicle.

The path estimation device 3 is mounted on the vehicle and sequentially estimates a path for the vehicle to be travelling on for each estimation time several seconds ahead. The path estimation device 3 also includes a processor 3a, a ROM 3b, and a RAM 3c like the control ECU 2 does.

The processor 3a is a calculation processing circuit that performs various types of calculation processing in the path estimation device 3, and is hardware called a processor, a calculation processing circuit, an electric circuit, or a controller. The processor 3a includes a set of one or more calculation processing circuits. The processor 3a is capable of reading a program from the ROM 3b and deploying the program on the RAM 3c to execute calculation processing.

The wireless communication device 4 wirelessly communicates with an external device. The wireless communication device 4 performs inter-vehicle communication, road-to-vehicle communication, or communication with a mobile communication terminal represented by smartphones. In the wireless communication device 4, a transmission unit 4b transmits a radio signal to an external device via an antenna 4a, and a reception unit 4c receives a radio signal from an external device via the antenna 4a.

Note that although the path estimation device 3 mounted on the vehicle is illustrated in FIG. 1, the first embodiment is not limited to this configuration.

For example, the path estimation device 3 may be a component included in a server device capable of wirelessly communicating with the control ECU 2 of the vehicle via the wireless communication device 4.

In this case, information necessary for the path estimation of the vehicle is transmitted from the vehicle to the server device via the wireless communication device 4, and the path estimation device 3 included in the server device determines an estimated path of the vehicle on the basis of the information received from the vehicle.

The estimated path information of the vehicle is transmitted from the server device to the vehicle, and the control ECU 2 of the vehicle sets the path indicated by the estimated path information received from the server device as the path of the vehicle.

Figure 2:
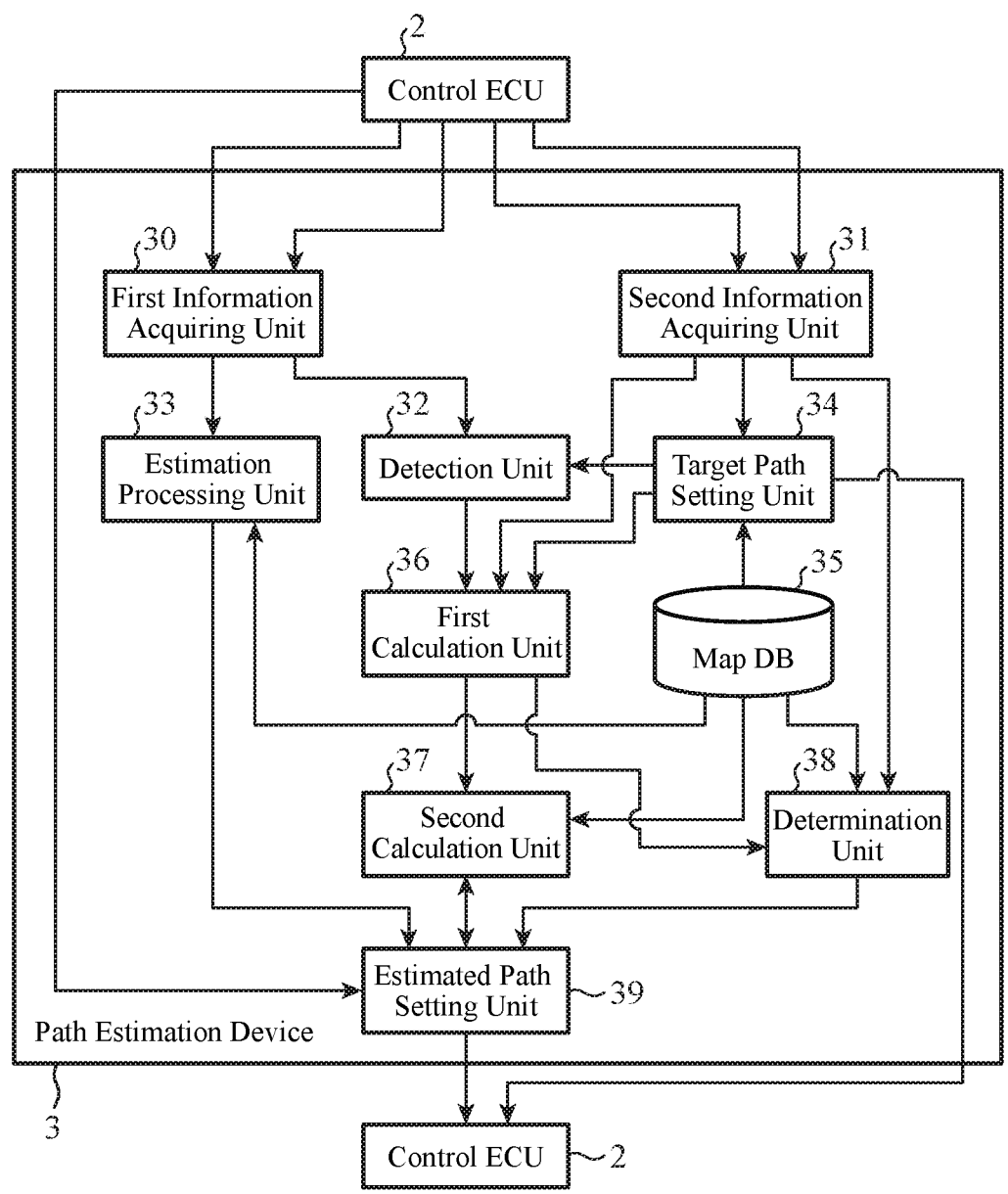
FIG. 2 is a block diagram illustrating a functional configuration of a path estimation device according to the first embodiment.

FIG. 2 is a block diagram illustrating a functional configuration of the path estimation device 3. As illustrated in FIG. 2, the path estimation device 3 includes a first information acquiring unit 30, a second information acquiring unit 31, a detection unit 32, an estimation processing unit 33, a target path setting unit 34, a map database (hereinafter referred to as map DB) 35, a first calculation unit 36, a second calculation unit 37, a determination unit 38, and an estimated path setting unit 39.

The first information acquiring unit 30 acquires information of the state of a moving object present around the vehicle. The information of the state of the moving object includes the position and the moving speed of a vehicle or a pedestrian present around the vehicle, and is acquired from, for example, the control ECU 2.

Note that the first information acquiring unit 30 may directly acquire, from the group of sensors 1, information of the state of the moving object present around the vehicle.

The second information acquiring unit 31 acquires information of the state of the vehicle.

The information of the state of the vehicle includes the position and the moving speed of the vehicle, and is acquired from, for example, the control ECU 2.

Note that the second information acquiring unit 31 may directly acquire information of the state of the vehicle from the group of sensors 1.

The detection unit 32 detects information of the state of each of a preceding vehicle of the vehicle and a vehicle ahead of the preceding vehicle traveling on a target path on the basis of the information of the state of the moving object acquired by the first information acquiring unit 30 and the target path information set by the target path setting unit 34.

For example, the detection unit 32 recognizes the preceding vehicle from moving objects present around the vehicle and detects information of the state of the recognized preceding vehicle from the information of the state of the moving objects.

Likewise, the detection unit 32 recognizes the vehicle ahead of the preceding vehicle from the moving objects present around the vehicle and detects information of the state of the recognized vehicle ahead of the preceding vehicle from the information of the state of the moving objects.

The estimation processing unit 33 calculates estimated position information of a moving object at each of time steps at estimation time on the basis of the information of the state of the moving objects acquired by the first information acquiring unit.

Estimation time is sequentially set from the current time, and is, for example, set sequentially from the current time at certain time intervals.

The estimation processing unit 33 calculates an estimated position of the moving object at each of time steps up to the estimation time on the basis of the information of the state of the moving object.

For example, on the assumption that the moving object performs uniform linear motion, the estimation processing unit 33 calculates the estimated position of the moving object on the basis of the position and the velocity of the moving object at the current time.

The estimation processing unit 33 may calculate the estimated position of the moving object on the basis of the position, the velocity, and the acceleration of the moving object at the current time.

Moreover, the estimation processing unit 33 may calculate the estimated position of moving objects for each lane of a road on which the vehicle is traveling on the basis of road information read from the map DB 35.

The target path setting unit 34 sets a target path to the final destination of the vehicle on the basis of the information of the state of the vehicle acquired by the second information acquiring unit 31 and the map information.

For example, the target path setting unit 34 searches for the target path from the current position of the vehicle to the final destination on the basis of the current position of the vehicle included in the information of the state of the vehicle, map information including this position, and a preset final destination, and sets the target path information in the control ECU 2.

The target path information is further output from the target path setting unit 34 to the detection unit 32 and the first calculation unit 36. In addition to the path from the current position of the vehicle to the final destination, the target path information includes a recommended speed for each of the lanes on the road and the distance from a guided point to the branch in a case where a branch is included (hereinafter described as branch-arrival distance).

The map DB 35 is a database in which map information is registered. The map information includes, for example, the number of lanes of a road, the position information of lanes, the structure of roads, and the recommended speed for each lane.

The position information of a lane includes absolute coordinate values (for example, latitude and longitude) of each of a group of points included in the center line of the lane. The structure of a road is information indicating the position of a curve, the position of a stop line, and the position of a traffic light.

The first calculation unit 36 calculates a time margin when a vehicle traveling on the target path overtakes the preceding vehicle on the basis of information of the state of the vehicle acquired by the second information acquiring unit 31, the target path information set by the target path setting unit 34, and the information of the state of the preceding vehicle and the vehicle ahead of the preceding vehicle acquired by the detection unit 32.

For example, in a case where the target path includes a branch, the first calculation unit 36 determines, as an upper limit value, shorter one of branch-arrival time for the vehicle to arrive at the branch and space-securing time during which a space allowing the vehicle to enter between the preceding vehicle and the vehicle ahead of the preceding vehicle is secured.

Next, the first calculation unit 36 determines, as a lower limit value, time required for the vehicle to overtake the preceding vehicle and to enter the space between the preceding vehicle and the vehicle ahead of the preceding vehicle.

Then, the first calculation unit 36 calculates a difference between the upper limit value and the lower limit value determined in this manner as a time margin for the vehicle to overtake the preceding vehicle.

The second calculation unit 37 calculates weighting for the cost of each of the lane in which the vehicle is traveling and an adjacent lane and performs weighting depending on the length of the time margin.

For example, in a case where the second calculation unit 37 compares the standard time required for the vehicle to overtake a preceding vehicle with the time margin and the two coincide with each other, weighting for the two are calculated and weighting is performed such that the cost of the lane in which the vehicle is traveling becomes equal to the cost of the adjacent lane.

In a case where the time margin is shorter than the standard time, the second calculation unit 37 calculates weighting of the two and performs weighting such that the cost of the lane on which the vehicle is traveling becomes lower than the cost of the adjacent lane.

In a case where the time margin is longer than the standard time, the second calculation unit 37 calculates weighting of the two and performs weighting such that the cost of the lane on which the vehicle is traveling becomes higher than the cost of the adjacent lane.

The determination unit 38 determines an intermediate destination, which is the position of the vehicle at estimation time, for each estimation time. For example, the determination unit 38 determines the position information of an intermediate destination for each estimation time which is sequentially set from the current time, assuming that the vehicle travels at a constant velocity up to the estimation time, on the basis of the position and the speed of the vehicle acquired by the second information acquiring unit 31 and the map information.

The estimated path setting unit 39 generates a plurality of candidate estimated paths depending on cost information of lanes on the basis of cost information of the lanes weighted by the second calculation unit 37, the position information of intermediate destinations determined by the determination unit 38, and the estimated position information of the moving objects calculated by the estimation processing unit 33.

For example, the estimated path setting unit 39 sets information of the state of the vehicle (position, speed, acceleration, and steering angle) at the time when the time up to the estimation time starts to be measured as information of the initial state.

Subsequently, the estimated path setting unit 39 sets positions where the vehicle can reach from the current time to a following time step as candidate estimated positions of the vehicle at the following time step on the basis of the information of the initial state. At this time, the estimated path setting unit 39 prioritizes a position on a lane where a low cost is set from among the positions that the vehicle can reach from the current time to the following time step and sets the position as a candidate estimated position.

The estimated path setting unit 39 estimates the speed, the acceleration, and the steering angle of the vehicle for each of the candidate estimated positions at the following time step and sets the estimation results as the state of the vehicle at each of the candidate estimated positions.

Subsequently, the estimated path setting unit 39 sets positions where the vehicle can reach from the following time step to a time step ahead of the following time step as a candidate estimated position of the vehicle at the following time step on the basis of the information of the state of the vehicle at the following time step.

Then, the estimated path setting unit 39 estimates the speed, the acceleration, and the steering angle of the vehicle for each of the candidate estimated positions at the time step ahead of the following time step and sets the estimation results as the state of the vehicle at each of the candidate estimated positions.

By repeating such processing, the estimated path setting unit 39 generates a plurality of candidate estimated paths on which the vehicle travels toward the intermediate destination while avoiding moving objects present by the estimation time.

The estimated path setting unit 39 sets an estimated path selected from a plurality of candidate estimated paths as a path of the vehicle for each estimation time. For example, the estimated path setting unit 39 selects, as an estimated path of the vehicle, a candidate estimated path having the smallest total sum of the costs of all estimated positions.

The estimated path information, selected by the estimated path setting unit 39 for each estimation time, is output to the control ECU 2. The control ECU 2 controls the operation of the vehicle in accordance with the estimated path information input from the estimated path setting unit 39 to cause the vehicle to travel along the estimated path.

Note that although FIG. 2 illustrates that the path estimation device 3 includes the first information acquiring unit 30, the second information acquiring unit 31, the detection unit 32, the estimation processing unit 33, the target path setting unit 34, the map DB 35, the first calculation unit 36, the second calculation unit 37, the determination unit 38, and the estimated path setting unit 39, the first embodiment is not limited to this configuration.

For example, the target path setting unit 34 and the map DB 35 may be components included in an external device capable of communicating via the wireless communication device 4, and the first information acquiring unit 30, the second information acquiring unit 31, and the detection unit 32 may be components included in the control ECU 2.

In this case, the path estimation device 3 receives map information and target path information from the external device via the wireless communication device 4, and information of the state around the vehicle, information of the state of the vehicle, information of the state of the preceding vehicle, and information of the state of the vehicle ahead of the preceding vehicle are acquired from the control ECU 2.

That is, in the first embodiment, the path estimation device 3 may not include the first information acquiring unit 30, the second information acquiring unit 31, the detection unit 32, the target path setting unit 34, and the map DB 35.

Next, the operation will be described.

Figure 3:
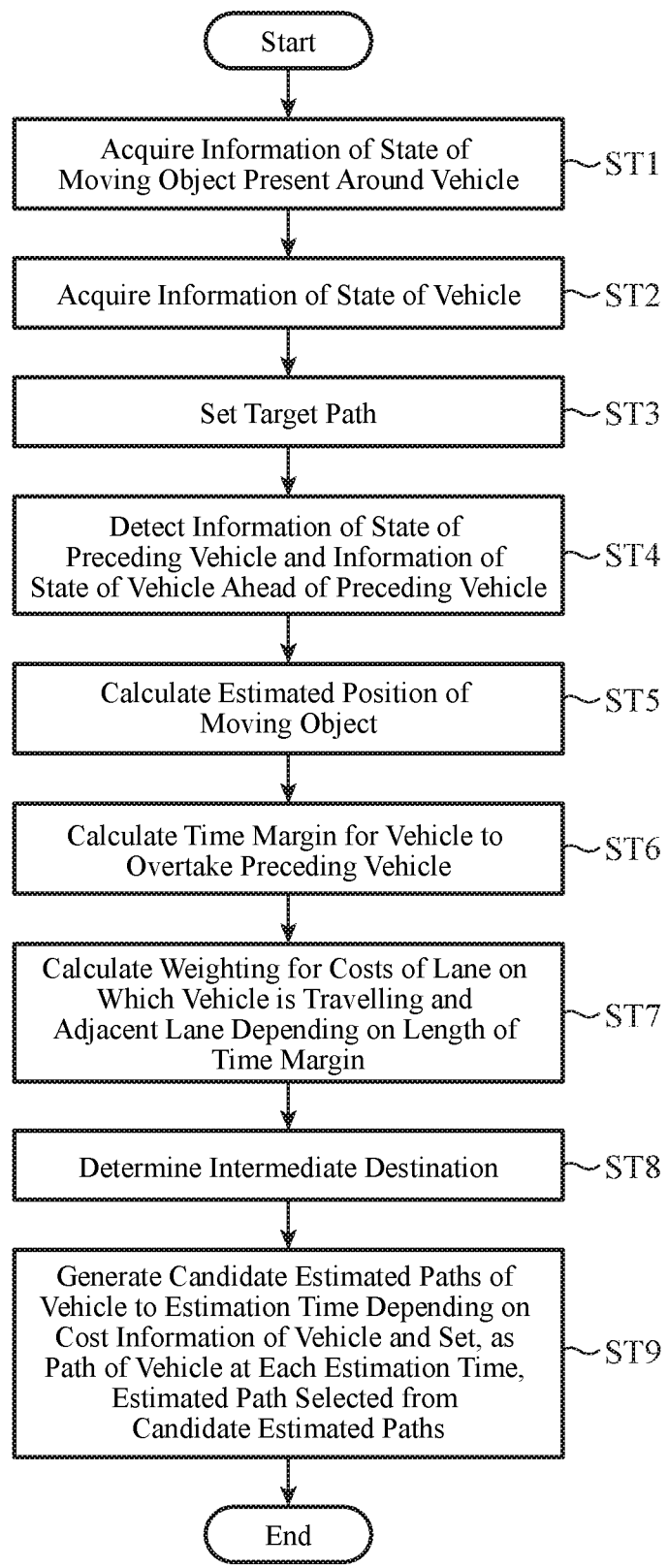
FIG. 3 is a flowchart illustrating a path estimation method according to the first embodiment.

FIG. 3 is a flowchart illustrating a path estimation method according to the first embodiment.

First, the first information acquiring unit 30 acquires information of the state of moving objects present around the vehicle (step ST). The information of the state of the moving objects includes the position and the moving speed of a vehicle or a pedestrian present around the vehicle.

For example, when different states are detected by sensors in the group of sensors 1 for a moving object, the first information acquiring unit 30 acquires information of the states of the moving object detected by the individual sensors.

When the states of the same moving object are redundantly detected by the plurality of sensors in the group of sensors 1, the first information acquiring unit 30 performs weighted averaging in consideration of the accuracy of these sensors and combines these pieces of detection information into one to obtain the final information of the state of the moving object.

As a result, highly accurate detection information can be obtained for the state of the moving object.

Note that the above-described weighted averaging of the information of the state of the moving object is executed by the control ECU 2 in tracking processing of the moving object around the vehicle. In this case, the first information acquiring unit 30 may acquire the weighted average value calculated by the control ECU 2 as information of the state of the moving object.

Next, the second information acquiring unit 31 acquires information of the state of the vehicle (step ST2). The information of the state of the vehicle includes the position and the moving speed of the vehicle.

For example, when different states are detected by sensors in the group of sensors 1 for the vehicle, the first information acquiring unit 30 acquires information of the states of the vehicle detected by the individual sensors. When the states of the vehicle are redundantly detected by the plurality of sensors in the group of sensors 1, the second information acquiring unit 31 performs weighted averaging in consideration of the accuracy of these sensors and combines these pieces of detection information into one to obtain the final information of the state of the vehicle. As a result, highly accurate detection information can be obtained for the state of the vehicle.

The target path setting unit 34 sets a target path to the final destination of the vehicle (step ST3). For example, the target path setting unit 34 searches for a target path from the current position of the vehicle to the final destination on the basis of the current position of the vehicle included in the information of the state of the vehicle, map information including the current position of the vehicle read from the map DB 35, and a preset final destination.

The target path information of the search result is output to the detection unit 32 and the first calculation unit 36, and is further set in the control ECU 2.

Note that each step of processing from step ST1 to step ST3 may be in a different order, or may be performed simultaneously.

The detection unit 32 detects information of the state of a preceding vehicle and a vehicle ahead of the preceding vehicle traveling on the target path (step ST4).

For example, the detection unit 32 recognizes, as a preceding vehicle, a moving object that is located ahead on the target path and is traveling at a position closest to the vehicle from among the moving objects present around the vehicle.

The detection unit 32 detects, from among the information of the state of the moving objects acquired by the first information acquiring unit 30, information of the state of the recognized preceding vehicle.

The information of the state of the preceding vehicle includes the current position and the speed of the preceding vehicle (speed in a direction along the target path).

Likewise, the detection unit 32 recognizes, as a vehicle ahead of the preceding vehicle, a moving object that is located ahead on the target path and is traveling at a position second closest to the vehicle from among the moving objects present around the vehicle.

The detection unit 32 detects, from among the information of the state of the moving objects acquired by the first information acquiring unit 30, information of the state of the recognized vehicle ahead of the preceding vehicle.

The moving object that is located ahead on the target path and is traveling at a position second closest to the vehicle is also located ahead the preceding vehicle and is traveling at a position closest to the preceding vehicle.

The information of the state of the vehicle ahead of the preceding vehicle includes the current position and the speed of the vehicle ahead of the preceding vehicle (speed in a direction along the target path).

Next, the estimation processing unit 33 calculates estimated position information of a moving object at each of time steps up to estimation time on the basis of the information of the state of the moving objects acquired by the first information acquiring unit (step ST5). Estimation time is sequentially set from the current time, and is, for example, set sequentially from the current time at certain time intervals of about several seconds.

For example, on the assumption that the moving object performs uniform linear motion up to the estimation time, the estimation processing unit 33 calculates an estimated position of the moving object on the basis of the position and the speed of the moving object at the current time.

Next, the first calculation unit 36 calculates a time margin for the vehicle to overtake the preceding vehicle (step ST6). Hereinafter, a case where the target path includes a branch will be described as an example.

Figure 4:
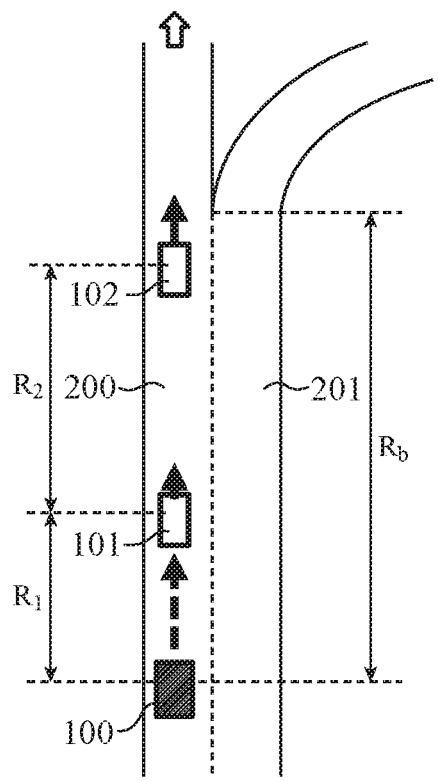
FIG. 4 is a diagram illustrating the positional relationship among a vehicle, a preceding vehicle, and a vehicle ahead of the preceding vehicle, traveling on a road having a branch.

FIG. 4 is a diagram illustrating the positional relationship among a vehicle 100, a preceding vehicle 101, and a vehicle 102 ahead of the preceding vehicle, traveling on a road having a branch.

In FIG. 4, the vehicle 100 includes the components illustrated in FIG. 1 and is mounted with the path estimation device 3. A lane 200 on which the vehicle 100 is traveling is a lane leading to the final destination, and an adjacent lane 201 is a lane leading to the branch. The preceding vehicle 101 is traveling in front of the vehicle 100 on the lane 200, and the vehicle 102 ahead of the preceding vehicle is traveling in front of the preceding vehicle 101 on the lane 200.

The first calculation unit 36 substitutes a branch-arrival distance Rb included in target path information and a velocity $V_{ego}$ of the vehicle 100 included in information of the state of the vehicle 100 into the following equation (1) to calculate branch-arrival time $T_{lim}$, which is time required for the vehicle 100 to reach the branch.

The first calculation unit 36 substitutes an inter-vehicle distance $R_1$ between the vehicle 100 and the preceding vehicle 101, a separation distance $TH_{R1}$ of the vehicle 100 from the preceding vehicle 101, and the velocity $V_{p1}$ of the preceding vehicle 101 into the following equation (2) to calculate the time required for the vehicle 100 to complete overtaking of the preceding vehicle 101.

The above time calculated using the following equation (2) is the time required for the vehicle 100 to complete overtaking of the preceding vehicle 101, that is, the time required for the vehicle 100 to overtake the preceding vehicle 101 and to enter between the preceding vehicle 101 and the vehicle 102 ahead of the preceding vehicle.

In the first embodiment, this time is regarded as a lower limit value $T_{lower}$.

Note that the separation distance $TH_{R1}$ from the preceding vehicle 101 is the distance the vehicle 100 can approach the preceding vehicle 101 most when overtaking the preceding vehicle 101, which is a value obtained empirically.

The velocity $V_{ego}$ is a speed in a direction along the target path of the vehicle 100. The velocity $V_{p1}$ is a speed in a direction along the target path of the preceding vehicle 101.

$$T_{lim} = \frac{R_b}{V_{ego}} \quad (1)$$

$$T_{lower} = \frac{(R_1 + TH_{R1})}{(V_{ego} - V_{p1})} \quad (2)$$

The first calculation unit 36 calculates space-securing time $T_{space}$ by substituting an inter-vehicle distance $R_2$ between the preceding vehicle 101 and the vehicle 102 ahead of the preceding vehicle, an inter-vehicle distance $TH_{R2}$ between the preceding vehicle 101 and the vehicle 102 ahead of the preceding vehicle, the velocity $V_{p1}$ of the preceding vehicle 101, and a velocity $V_{p2}$ of the vehicle 102 ahead of the preceding vehicle into the following equation (3).

Here, the inter-vehicle distance $TH_{R2}$ is an inter-vehicle distance between the preceding vehicle 101 and the vehicle 102 ahead of the preceding vehicle that is necessary for the vehicle 100 having overtaken the preceding vehicle 101 to enter between the preceding vehicle 101 and the vehicle 102 ahead of the preceding vehicle. The inter-vehicle distance $TH_{R2}$ is, for example, a value obtained by adding an allowance length to the entire length of the vehicle 100, which is a value obtained empirically.

The space-securing time $T_{space}$ is time required for ensuring a space allowing the vehicle 100 to enter between the preceding vehicle 101 and the vehicle 102 ahead of the preceding vehicle.

$$T_{space} = \begin{cases} \dfrac{(R_2 - TH_{R2})}{(V_{p1} - V_{p2})} & \text{(in a case where } V_{p1} > V_{p2}) \\ \infty & \text{(in a case where } V_{p1} \leq V_{p2}) \end{cases} \quad (3)$$

The first calculation unit 36 determines a shorter one of the branch-arrival time $T_{lim}$ and the space-securing time $T_{space}$ as an upper limit value $T_{upper}$ in accordance with the following equation (4).

When the lower limit value $T_{lower}$ and the upper limit value $T_{upper}$ are determined in this manner, the first calculation unit 36 calculates the difference between the upper limit value $T_{upper}$ and the lower limit value $T_{lower}$ as a time margin $T_{mrgn}$ for the vehicle 100 to overtake the preceding vehicle 101 in accordance with the following equation (5).

Since the first calculation unit 36 calculates the time margin $T_{mrgn}$ on the assumption that the vehicle 100 is traveling at a constant velocity $V_{ego}$, the time margin $T_{mrgn}$ for the vehicle 100 to overtake the preceding vehicle 101 can be obtained by simple calculation.

$$T_{upper} = \min(T_{lim}, T_{space}) \quad (4)$$

$$T_{mrgn} = T_{upper} - T_{lower} \quad (5)$$

Next, the second calculation unit 37 calculates weighting information of the cost of each of the lane in which the vehicle 100 is traveling and the adjacent lane depending on the length of the time margin $T_{mrgn}$ (step ST7).

Figure 5:
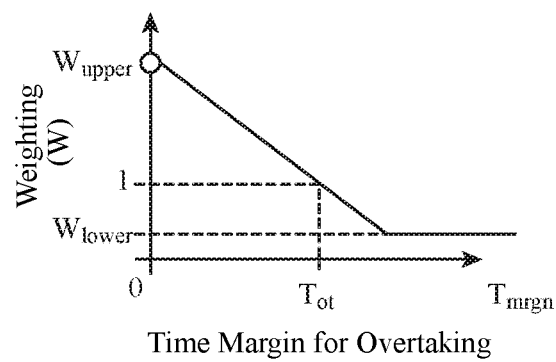
FIG. 5 is a graph illustrating the relationship between the weighting for the cost of a lane and the time margin for overtaking.

FIG. 5 is a graph illustrating the relationship between the weighting W for a cost of a lane and the time margin $T_{mrgn}$ for overtaking. In FIG. 5, weighting $W_{upper}$ is the maximum value of weighting given to the cost of the lane, and weighting $W_{lower}$ is the minimum value of the weighting given to the cost of the lane. The standard time $T_{ot}$ is time normally required for the vehicle 100 to overtake the preceding vehicle 101. For example, eight seconds may be set assuming that after the vehicle 100 changes lanes to the adjacent lane 201 and overtakes the preceding vehicle 101 in four seconds and returns to the lane 200 in four seconds.

For example, the second calculation unit 37 compares the standard time $T_{ot}$ and the time margin $T_{mrgn}$, and in a case where the two coincide with each other, weighting for the two are calculated and weighting is performed such that the cost of the lane 200 on which the vehicle 100 is traveling becomes equal to the cost of the adjacent lane 201.

Note that since the same standard cost is originally set to the lane 200 and the adjacent lane 201 in the example illustrated in FIG. 5, W=1 is set as the weighting for the both.

In a case where the time margin $T_{mrgn}$ is shorter than the standard time $T_{ot}$, the second calculation unit 37 calculates weighting W of the two and performs weighting such that the cost of the lane 200 on which the vehicle 100 is traveling becomes lower than the cost of the adjacent lane 201.

For example, in a case where the time margin $T_{mrgn}$ is 0 or a negative value, the second calculation unit 37 may set an infinite value or an extremely large value as $W_{upper}$ to be given to the cost of the adjacent lane 201 such that an estimated path on which the vehicle 100 overtakes the preceding vehicle 101 is not selected.

In a case where the time margin $T_{mrgn}$ is longer than the standard time $T_{ot}$, the second calculation unit 37 calculates weighting W of the two and performs weighting such that the cost of the lane 200 on which the vehicle 100 is traveling becomes higher than the cost of the adjacent lane 201.

For example, in a case where the time margin $T_{mrgn}$ is sufficiently longer than the standard time $T_{ot}$, the second calculation unit 37 gives weighting $W_{lower}$ to the cost of the adjacent lane 201 such that an estimated path on which the vehicle 100 overtakes the preceding vehicle 101 after changing lanes to the adjacent lane 201 is likely to be selected. In FIG. 5, the weighting $W_{upper}$ and the weighting $W_{lower}$ may be set as appropriate by a user.

Figure 6:
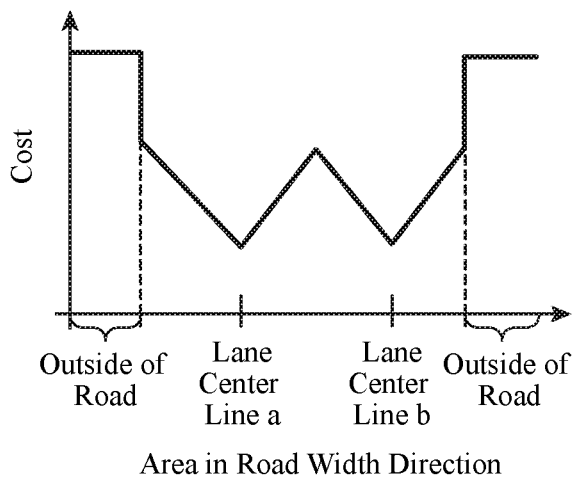
FIG. 6 is a graph illustrating the relationship between the area in the road width direction and the cost when the same cost is set for a lane on which a vehicle is traveling and an adjacent lane.

FIG. 6 is a graph illustrating the relationship between the area in the road width direction and the cost when the same cost is set for the lane 200 on which the vehicle 100 is traveling and the adjacent lane 201. In FIG. 6, the same value is set as a standard cost for each of the cost for the center line a of the lane 200 on which the vehicle 100 is traveling and the center line b of the adjacent lane 201.

The cost of the lane 200 is obtained by adding up the cost corresponding to a Euclidean distance between a node 302 and the center line a of the lane 200 with respect to the standard cost set to the center line a of the lane 200.

Likewise, the cost of the adjacent lane 201 is obtained by adding up the cost corresponding to a Euclidean distance between the node 302 and the center line b of the adjacent lane 201 with respect to the standard cost set to the center line b of the adjacent lane 201.

The second calculation unit 37 sets weighting W=1 to the cost of the lane 200 and the cost of the adjacent lane 201.

As a result, the cost becomes the lowest at the center line of each of the lanes while the cost increases with distance away from the center line of a lane, and thus a candidate estimated path deviating from the center line of a lane becomes unlikely to be selected. Meanwhile, since the maximum value of cost is set to the outside of the road as illustrated in FIG. 6, a candidate estimated path 301 on which the vehicle 100 travels outside the road is not selected.

Figure 7:
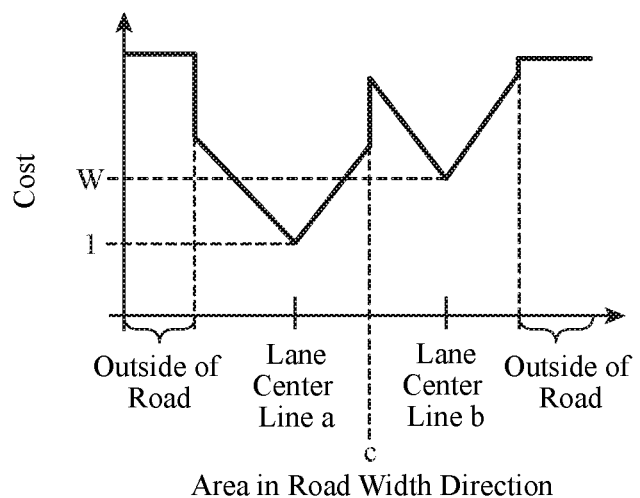
FIG. 7 is a graph illustrating the relationship between the area in the road width direction and the cost when a higher cost is set for an adjacent lane than that of a lane on which a vehicle is traveling.

FIG. 7 is a graph illustrating the relationship between the area in the road width direction and the cost when a higher cost is set for the adjacent lane 201 than that of the lane 200 on which the vehicle 100 is traveling. In FIG. 7, a partitioning line c is a boundary between the lane 200 and the adjacent lane 201.

In a case where the time margin $T_{mrgn}$ is shorter than the standard time $T_{ot}$, the second calculation unit 37 calculates weighting of the two and performs weighting such that the cost of the lane 200 becomes smaller than the cost of the adjacent lane 201. At this time, since the weighting is added to the cost of the adjacent lane 201 beyond the partitioning line c, the cost of the adjacent lane 201 is relatively higher than that of the lane 200 as illustrated in FIG. 7. As a result, the candidate estimated path 301 along which the vehicle 100 travels on the adjacent lane 201 becomes less likely to be selected.

Figure 8:
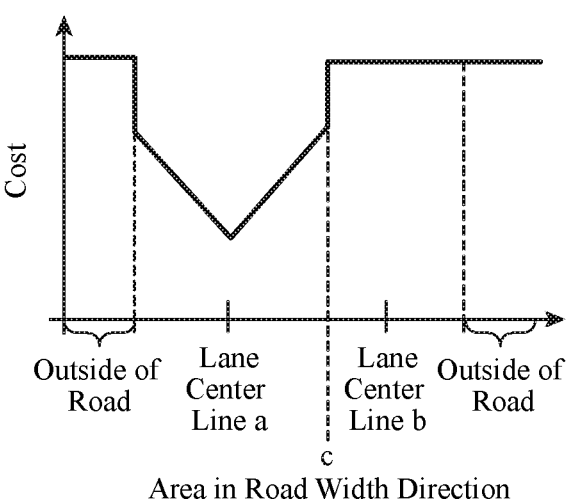
FIG. 8 is a graph illustrating the relationship between the area in the road width direction and the cost when the highest cost is set for an adjacent lane.

FIG. 8 is a graph illustrating the relationship between the area in the road width direction and the cost when the highest cost is set to the adjacent lane 201. In FIG. 8, a partitioning line c is a boundary between the lane 200 and the adjacent lane 201 like in FIG. 7.

In a case where the time margin $T_{mrgn}$ is 0 or a negative value, the second calculation unit 37 adds the maximum value of weighting $W_{upper}$ to the cost of the adjacent lane 201 such that an estimated path on which the vehicle 100 changes lines to the adjacent lane 201 is not selected. As a result, since the maximum value of the cost is set to the adjacent lane 201 like the outside of the road, a candidate estimated path 301 along which the vehicle 100 travels on the adjacent lane 201 is not selected.

Figure 9:
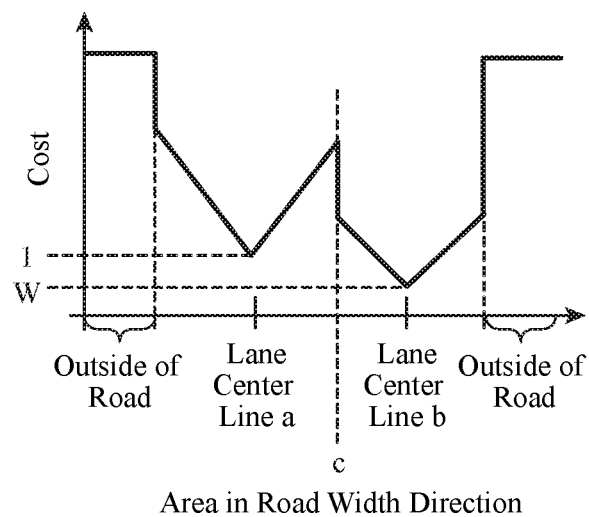
FIG. 9 is a graph illustrating the relationship between the area in the road width direction and the cost when a lower cost is set for an adjacent lane than that of a lane on which the vehicle is traveling.

FIG. 9 is a graph illustrating the relationship between the area in the road width direction and the cost when a lower cost is set for the adjacent lane 201 than that of the lane 200 on which the vehicle 100 is traveling. In FIG. 9, a partitioning line c is a boundary between the lane 200 and the adjacent lane 201 like in FIG. 7.

In a case where the time margin $T_{mrgn}$ is longer than the standard time $T_{ot}$, the second calculation unit 37 adds weighting $W_{lower}$ to the cost of the adjacent lane 201 such that an estimated path on which the vehicle 100 change lines to the adjacent lane 201 is likely to be selected.

As a result, the cost of the adjacent lane 201 drops relatively to the lane 200 as illustrated in FIG. 9, a candidate estimated path 301 along which the vehicle 100 travels on the adjacent lane 201 becomes more likely to be selected.

Alternatively, the second calculation unit 37 may calculate the cost for an estimated position of the vehicle 100 at each time step estimated by the estimated path setting unit 39.

Figure 10:
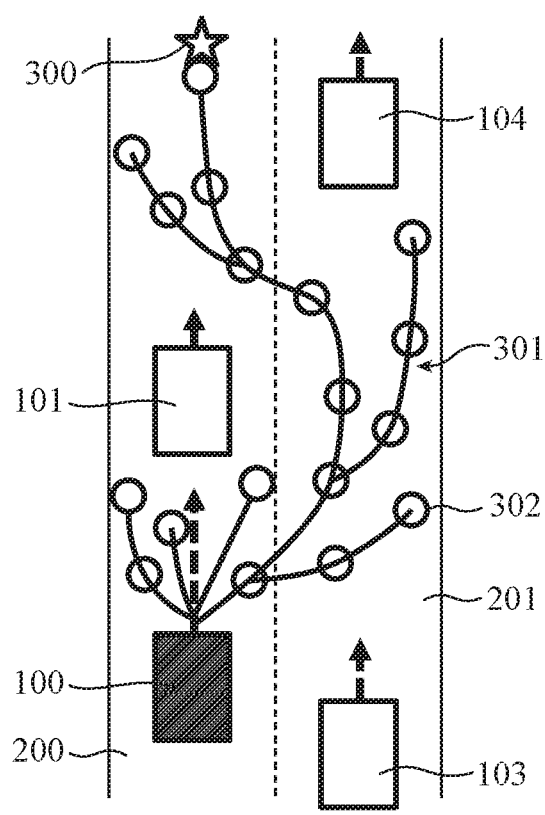
FIG. 10 is a diagram illustrating candidate estimated paths of a vehicle.

FIG. 10 is a diagram illustrating candidate estimated paths of the vehicle 100 and illustrating a plurality of candidate estimated paths generated from the current position of the vehicle 100 to an intermediate destination 300 by the estimated path setting unit 39. FIG. 10 illustrates, as candidate estimated paths 301, candidate estimated paths that follow a preceding vehicle 101 and candidate estimated paths 301 that lead to the intermediate destination 300 while avoiding vehicles 103 and 104 traveling on an adjacent lane 201.

As illustrated in FIG. 10, a candidate estimated path 301 is formed by connecting, by a link, each node 302 set at an estimated position of the vehicle 100 at each time step.

Moreover, information of the state of the vehicle 100 for each estimated position is set in a node 302. Hereinafter, an estimated position of the vehicle 100 is referred to as a node 302 for the sake of convenience.

The second calculation unit 37 may set a lower cost as a node 302 at the end of a path or a node 302 closest to the intermediate destination 300 in the plurality of candidate estimated paths 301 approaches the intermediate destination 300.

In addition, the second calculation unit 37 may set a lower cost as a node 302 in the plurality of candidate estimated paths 301 approaches the center line of a lane.

By setting a cost to a node 302 in this manner and preferentially selecting a candidate estimated path 301 having a low total sum of costs of all the nodes 302, a candidate estimated path 301 that does not deviate from the lane becomes more likely to be selected.

The second calculation unit 37 may set a lower cost as an estimated speed of the vehicle 100 included in each node 302 of a candidate estimated path 301 approaches a recommended speed.

By setting costs to the nodes 302 and preferentially selecting a candidate estimated path 301 having a low total sum of costs of all the nodes 302 in this manner, a candidate estimated path 301 having less variations in the speed of the vehicle 100 becomes more likely to be selected.

In addition, the second calculation unit 37 may set a higher cost as a node 302 approaches an estimated position of a moving object.

By setting costs to the nodes 302 and preferentially selecting a candidate estimated path 301 having a low total sum of costs of all the nodes 302 in this manner a candidate estimated path 301 on which the vehicle 100 avoids the moving object becomes more likely to be selected.

The second calculation unit 37 may combine the cost settings for anode 302.

For example, the second calculation unit 37 sets a low cost to a node 302 closer to the center line of a lane among a plurality of nodes 302 included in a candidate estimated path 301, sets a low cost to a node 302 at which an estimated speed of the vehicle 100 is close to a recommended speed, and sets a high cost to a node 302 close to an estimated position of the moving object.

Let us return to the explanation of FIG. 3.

In step ST8, the determination unit 38 determines an intermediate destination 3).

For example, on the assumption that the vehicle 100 travels at a constant speed until estimation time, the determination unit 38 determines position information of the intermediate destination 300 for each estimation time $T_{pre}$ set sequentially from the current time t on the basis of the position and the speed of the vehicle 100 and map information.

In step ST9, the estimated path setting unit 39 generates a plurality of candidate estimated paths 301 on which the vehicle 100 travels toward the intermediate destination 300 while avoiding the moving objects present by the estimation time, depending on the cost information of the lanes. The estimated path setting unit 39 sets an estimated path selected from the plurality of candidate estimated paths 301 as the path of the vehicle 100 for each estimation time.

For example, the estimated path setting unit 39 sets, in the control ECU 2, estimated path information selected for each estimation time. The control ECU 2 controls the operation of the vehicle 100 in accordance with the estimated path information set from the estimated path setting unit 39 and thereby causes the vehicle 100 to travel along the estimated path.

Next, details of processing for setting an estimated path will be described.

Figure 11:
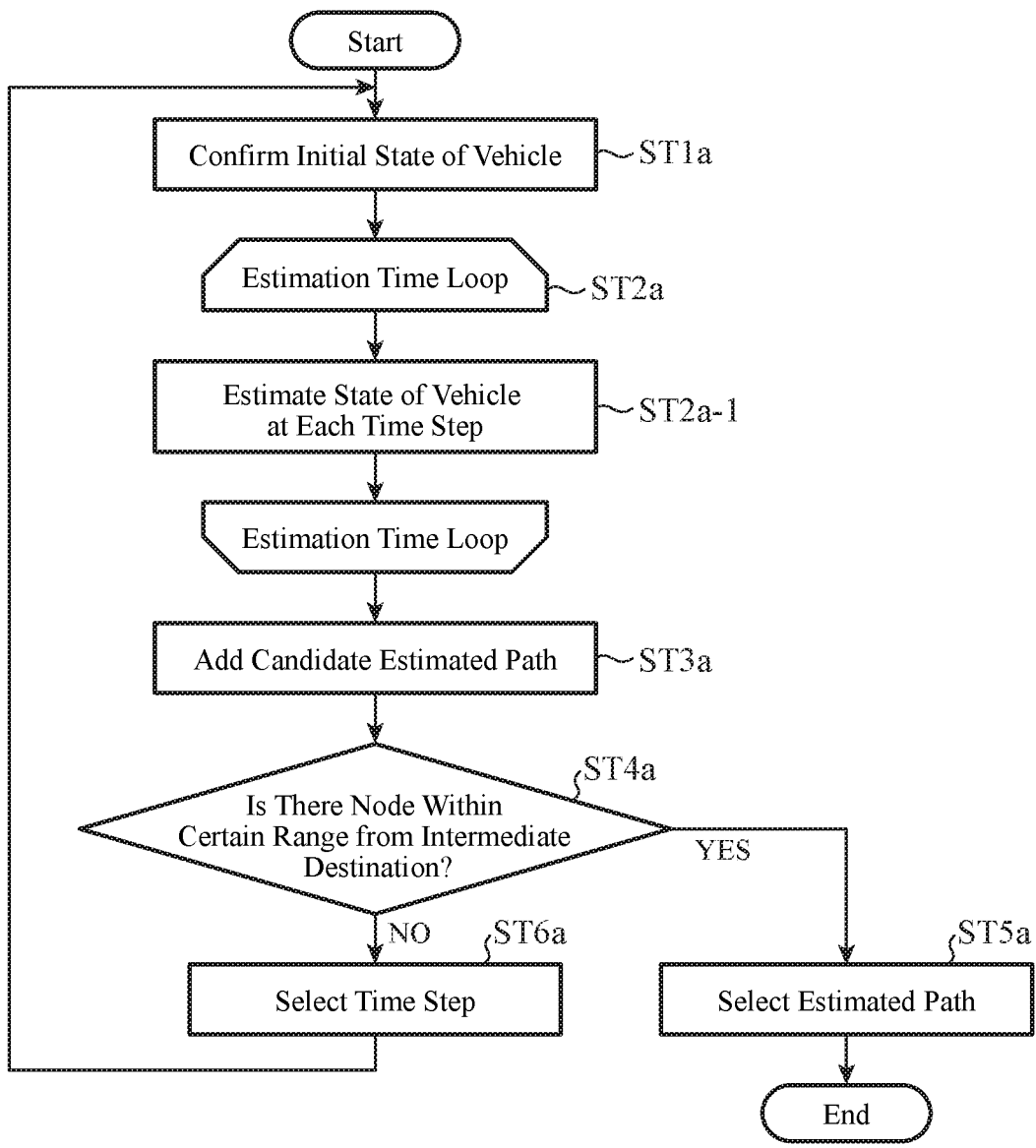
FIG. 11 is a flowchart illustrating the operation of an estimated path setting unit according to the first embodiment.

FIG. 11 is a flowchart illustrating the operation of the estimated path setting unit 39, and illustrates detailed processing of step ST9 of FIG. 3.

The estimated path setting unit 39 sets the initial state of the vehicle 100 (step ST1a).

The initial state of the vehicle 100 is the state (position, speed, acceleration, and steering angle) of the vehicle 100 at the time of starting the clocking of the estimation time.

Figure 12:
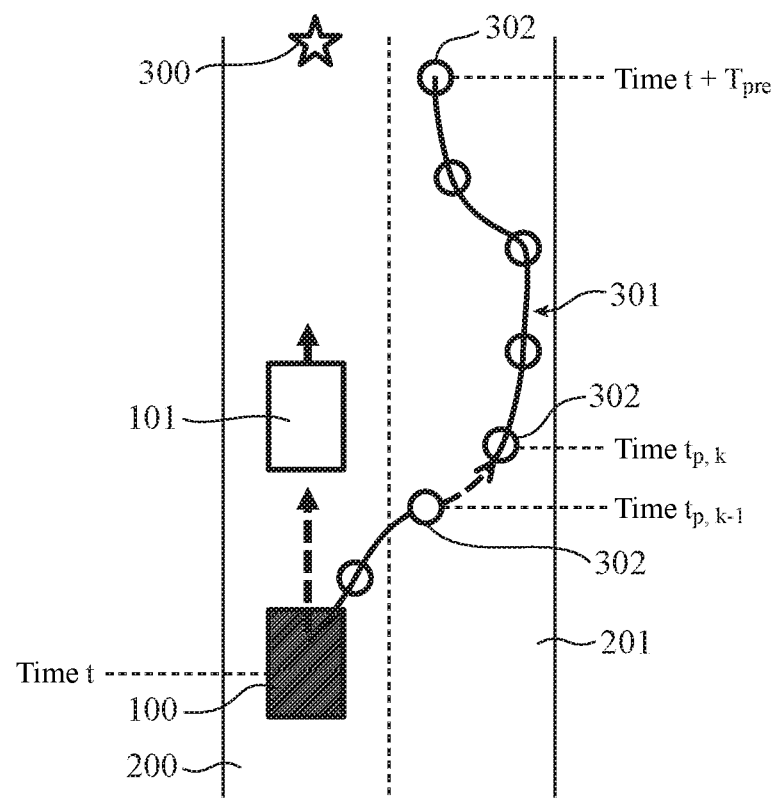
FIG. 12 is a diagram illustrating an outline of generation processing of a candidate estimated path.

FIG. 12 is a diagram illustrating an outline of generation processing of a candidate estimated path 301, and the candidate estimated path 301 of the vehicle 100 is illustrated from the current time t to estimation time $t+T_{pre}$. The estimated path setting unit 39 sets an initial state as the state of the vehicle 100 at time t.

The estimated path setting unit 39 executes processing of an estimation time loop (step ST2*a*).

In the estimation time loop, the state of the vehicle 100 at each time step is estimated from the current time t to the estimation time $t+T_{pre}$ (step ST2*a*-1).

The estimated path setting unit 39 sets a position where the vehicle 100 can reach from a previous time step $t_{p,\ k-1}$ to a following time step $t_{p,\ k}$ as a candidate estimated position of the vehicle 100 at the following time step $t_{p,\ k}$. At this time, the estimated path setting unit 39 prioritizes a position in a lane where a low cost is set from among positions that the vehicle 100 can reach by the time step $t_{p,\ k}$ as a candidate estimated position.

For example, as illustrated in FIG. 12, the estimated path setting unit 39 sets a vehicle control value to the state of the vehicle 100 at the previous time step $t_{p,\ k-1}$ to calculate the state of the vehicle 100 at the following time step $t_{p,\ k}$.

Assuming that the vehicle control value is the acceleration of the vehicle 100 and that the acceleration of the vehicle 100 follow a Gaussian distribution with an average value in and a standard deviation an, the estimated path setting unit 39 calculates the acceleration of the vehicle 100 at the following time step $t_{p,\ k}$ from random numbers of the Gaussian distribution.

As for the average value an, the acceleration of the vehicle 100 at the previous time steps $t_{p,\ k-1}$ or zero may be set. For the standard deviation $\sigma_{in}$, a standard value based on the vehicle performance may be set as a parameter.

A vehicle control value may be a steering angle or a change rate of the steering angle other than the acceleration of the vehicle 100, and can be set for each time step in the same manner as described above.

The estimated path setting unit 39 repeatedly performs the processing of step ST2*a* for each time step. Thus, the state of the vehicle 100 at each time step is calculated, and the path as illustrated in FIG. 12 is generated. The estimated path setting unit 39 adds the path, generated for each estimation time loop, to candidate estimated paths 301 (step ST3*a*).

Hereinafter, in some cases, a candidate estimated path 301 is referred to as a tree, and an estimated position of the vehicle 100 at each time step is referred to as a node for the sake of convenience.

Alternatively, the estimated path setting unit 39 may calculate N types of states (position, speed, acceleration, steering angle, etc.) of the vehicle 100 at each time step $t_{p,\ k}$ and set N nodes 302 for each time step $t_{p,\ k}$ on the basis of these states. As described above, a cost is set to each of the N nodes 302 by the second calculation unit 37.

The estimated path setting unit 39 may calculate the likelihood of the nodes 302 on the basis of the costs set to the nodes 302 according to the following equation (6). With this, the estimated path setting unit 39 may identify anode 302 having a high likelihood $L_i(k)$ from among the N nodes 302 at the previous time step $t_{p,\ k-1}$ and generate a node 302 at the following time steps $t_{p,\ k}$ from the identified node 302.

In the following equation (6), the likelihood $L_i(k)$ is a value obtained by normalizing a reciprocal of a cost Cost(i) set to one of the N nodes 302 by the sum of N reciprocals of the cost Cost(i).

$$L_i(k) = \frac{\frac{1}{\text{Cost}(i)}}{\sum_{i=1}^{N} \frac{1}{\text{Cost}(i)}} \tag{6}$$

Alternatively, the likelihood $L_i(k)$ of anode 302 may be calculated as follows.

Assuming that an error of each of m costs follows a Gaussian distribution, the error q can be calculated using the following equation (7). In the following equation (7), s denotes a vector formed by respective costs, and Σ represents an error covariance matrix.

$$q = \frac{1}{(\sqrt{2\pi})^m \sqrt{|\Sigma|}} \exp\left(-\frac{1}{2} s^T \Sigma^{-1} s\right) \tag{7}$$

For example, let us assume a cost corresponding to the distance between the node 302 and the center line of a lane, a cost corresponding to the distance between the node 302 and a moving object present around the vehicle, and a cost corresponding to a differential value between the speed of the vehicle 100 and a recommended speed set to the node 302.

A vector s consisting of these costs can be expressed by the following equation (8), and the error covariance matrix Σ can be expressed by the following equation (9).

The likelihood $L_i(k)$ of the node 302 can be calculated using the following equation (10).

In the following equation (8), W denotes a weighting coefficient for a cost set to a lane.

Note that when the node 302 is close to the lane 200, W=1 holds.

Where, $\Delta d_{lane}$ denotes the distance between the node 302 and the center line of a lane, $\Delta d_{obstacle}$ denotes the distance between the node 302 and a moving object present around the vehicle, and $\Delta V_{nom}$ denotes a differential value between the speed of the vehicle 100 and a recommended speed set to the node 302.

In the following equation (9), $\sigma_{ego}^2$ denotes an error variance of the position of the vehicle 100.

Symbol $\sigma_{obstacle}^2$ denotes an error variance of the position of a moving object present around the vehicle.

Symbol $\sigma_V^2$ denotes an error variance of the speed of the vehicle 100.

Note that although the off-diagonal elements of the error covariance matrix Σ are set to 0 for simplification in the following equation (9), a correlation component may be calculated and set to the off-diagonal elements.

The value of each element of the error covariance matrix Σ can be set on the basis of the accuracy of sensors that detect the position and the speed of the vehicle 100 and the position and the speed of a moving object present around the vehicle.

$$s = [W \cdot \Delta d_{lane}\ \Delta d_{obstacle}\ \Delta V_{nom}] \tag{8}$$

$$\Sigma = \begin{bmatrix} \sigma_{ego}^2 & & \\ & \sigma_{ego}^2 + \sigma_{obstacle}^2 & \\ & & \sigma_V^2 \end{bmatrix} \tag{9}$$

$$L_i(k) = \frac{q_1}{\sum_{i=1}^{N} q_1} \tag{10}$$

By reflecting cost information of a lane in the likelihood of the node 302, when a time margin $T_{mrgn}$ is long, candidate estimated paths 301 along which the vehicle 100 travels on the adjacent lane 201 increases in number and eventually becomes more likely to be selected since the number of nodes 302 generated in the adjacent lane 201 increases.

When the time margin $T_{mrgn}$ is short, candidate estimated paths 301 along which the vehicle 100 travels on the lane 200 increases in number and eventually becomes more likely to be selected since the number of nodes 302 generated in the lane 200 on which the vehicle 100 is currently traveling increases.

Let us return to the description of FIG. 11.

The estimated path setting unit 39 confirms whether there is a candidate estimated path in which a node 302 at the end of the path is set within a certain range from the intermediate destination 300 among a plurality of candidate estimated paths 301 (step ST4a).

If the node 302 at the end of the path is within the certain range from the intermediate destination 300 (step ST4a: YES), the estimated path setting unit 39 selects an estimated path from the plurality of candidate estimated paths 301 (step ST5a).

For example, the estimated path setting unit 39 selects, as the estimated path, a candidate estimated path 301 having the largest sum of the likelihood of nodes 302 from among the plurality of candidate estimated paths 301.

Alternatively, the estimated path setting unit 39 may select a candidate estimated path 301 having the lowest sum of costs set to nodes 302 from among the plurality of candidate estimated paths 301.

Furthermore, the estimated path setting unit 39 may integrate the N candidate estimated paths 301 into one candidate estimated path 301 by performing weighted averaging on the state of the vehicle 100 set to the nodes 302 for each time step in the N candidate estimated paths 301 by the likelihood of the nodes 302.

The control ECU 2 controls the operation of the vehicle 100 in accordance with the estimated path information set from the estimated path setting unit 39 and thereby causes the vehicle 100 to travel along the estimated path.

Figure 13:
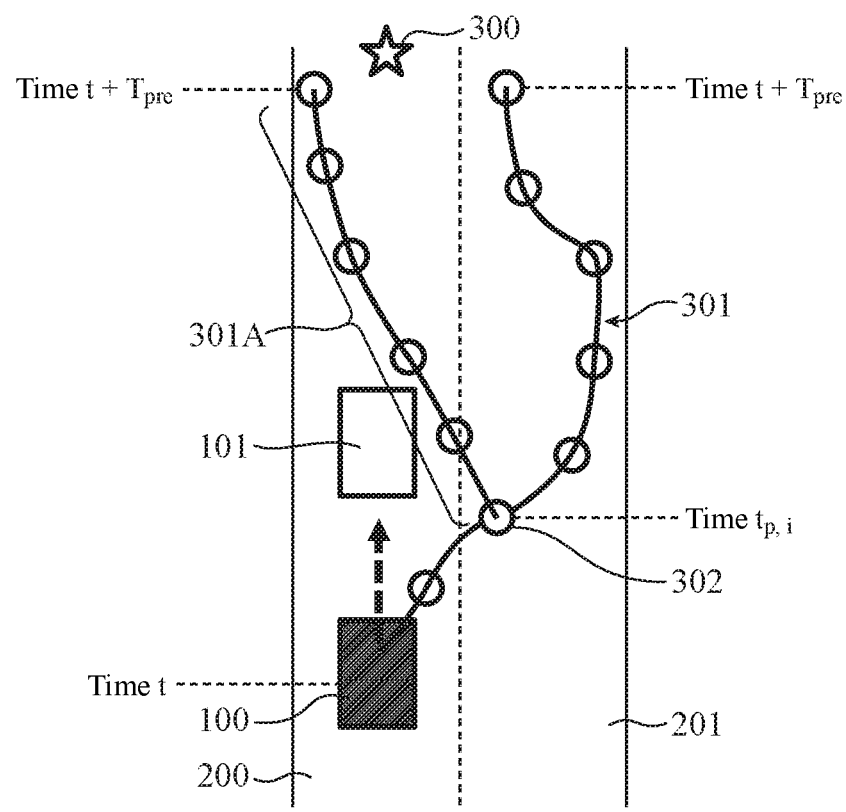
FIG. 13 is a diagram illustrating a plurality of candidate estimated paths branched from a node at a selected time step.

If the node 302 at the end of the path has not reached the certain range from the intermediate destination 300 (step ST4a: NO), the estimated path setting unit 39 selects a time step (step ST6a). FIG. 13 is a diagram illustrating a plurality of candidate estimated paths 301 branched from a node 302 at a selected time step $t_{p,i}$.

In step ST6a, the estimated path setting unit 39 selects one candidate estimated path 301 from the plurality of candidate estimated paths 301 in a similar manner as the above.

Then, the estimated path setting unit 39 selects a node 302 from the selected candidate estimated path 301, and selects a time step $t_{p,i}$ of the selected node 302.

For example, a node 302 having the likelihood higher than a certain threshold value may be selected, a node 302 having a cost being lower than a certain threshold value may be selected, or a node 302 may be randomly selected using uniform random numbers.

The estimated path setting unit 39 returns to the processing of step ST1a after selecting the time step $t_{p,i}$. Here, the estimated path setting unit 39 performs the processing from steps ST1a to ST3a with the node 302 at the time step $t_{p,i}$ regarded as a node 302 in the initial state of the vehicle 100.

As a result, nodes 302 for respective time steps up to estimation time $\Delta T_{pre,i}$ represented by the following equation (11) are generated, and an additional tree 301A formed by these nodes 302 is generated. A node 302 at the end of the additional tree 301A is the node 302 at time $t+T_{pre}$.

$$\Delta T_{pre,i} = t + T_{pre} - t_{p,i} \tag{11}$$

After generating a candidate estimated path 301 connected with the additional tree 301A at the node 302 at the time step $t_{p,i}$, the estimated path setting unit 39 repeats the above processing until a node 302 at the end of the candidate estimated path 301 reaches the certain range from the intermediate destination 300.

For example, in a case where the total number of nodes 302 in the candidate estimated path 301 before branching is P1 and the total number of nodes 302 in the additional tree 301A is P2, the estimated path setting unit 39 selects one node 302 from (P1+P2) nodes 302 and repeats the above processing.

Figure 14:
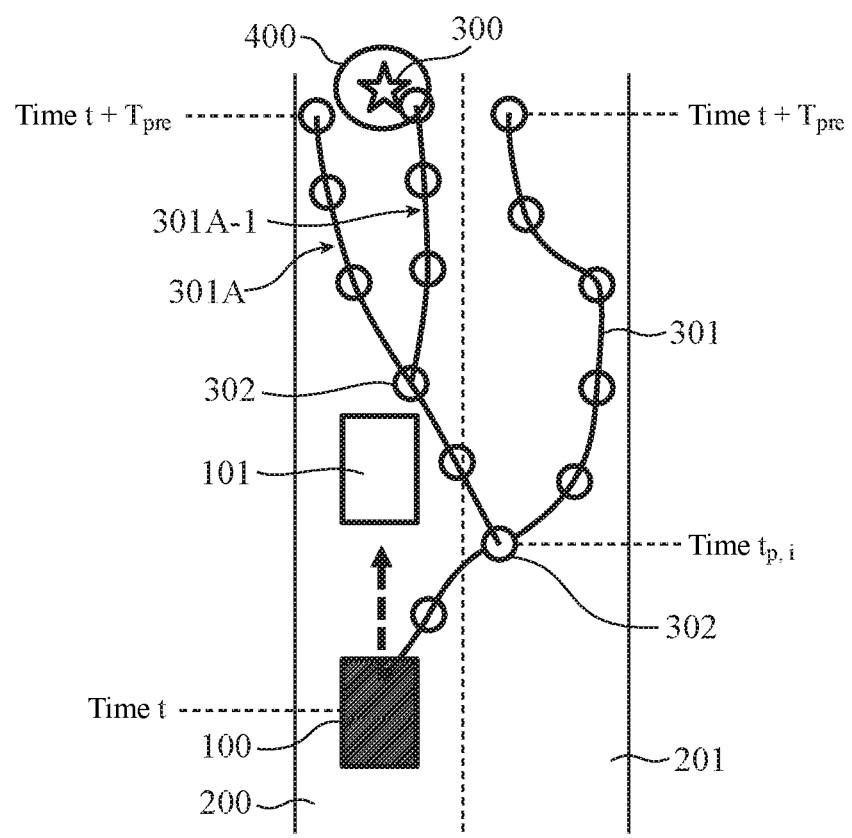
FIG. 14 is a diagram illustrating a plurality of candidate estimated paths branched from a node at each of multiple selected time steps.

FIG. 14 is a diagram illustrating a plurality of candidate estimated paths 301 branched from nodes at selected multiple time steps. In the example of FIG. 14, the estimated path setting unit 39 has generated candidate estimated paths 301 connected with each of the additional tree 301A and another additional tree 301A-1. When a node 302 at the end reaches a certain range 400 from the intermediate destination 300, the estimated path setting unit 39 proceeds to the processing of step ST5a of FIG. 11.

The estimated path setting unit 39 selects one estimated path from the branched plurality of candidate estimated paths 301. For example, the estimated path setting unit 39 selects a path in which a node 302 at the end is closest to the intermediate destination 300, out of the branched plurality of candidate estimated paths 301.

Moreover, the estimated path setting unit 39 may calculate the cost of each of the branched paths and select a branched path with the lowest cost as the estimated path from among the branched plurality of candidate estimated paths 301.

The cost of a branched path may be the sum of costs set for all the nodes 302 included in the branched path.

For example, a j-th node 302 in a branched path can be calculated from the following equation (12). Note that $\alpha_i$ (i=1, 2, 3) is parameters for determining the weighting for a cost of each branched path, which may be set by a user as desired.

$$\text{Cost}(j) = \alpha_1 \cdot W \cdot \Delta d_{lane} + \alpha_2 \cdot \Delta d_{obstacle} + \alpha_3 \cdot \Delta V_{nom} \tag{12}$$

Although an example of generation processing of candidate estimated paths 301 has been described, a general path generation method may be used such as the Dijkstra's algorithm or the A* algorithm for generation of candidate estimated paths 301.

Moreover, although generation of a candidate estimated path 301 is terminated when a node 302 at the end reaches the certain range 400 from the intermediate destination 300, generation of a candidate estimated path 301 may be repeated as long as the processing capacity of the processor 3a of the path estimation device 3 allows.

The intermediate destination 300 may be set so as to follow the preceding vehicle 101 in a case where the time margin $T_{mrgn}$ is short and the vehicle 100 cannot overtake the preceding vehicle 101.

For example, the first calculation unit 36 calculates the time margin $T_{mrgn}$ using the above equation (5), and outputs a no-overtaking flag to the determination unit 38 when the time margin $T_{mrgn}$ is 0 or negative.

When having recognized that the vehicle 100 cannot overtake the preceding vehicle 101 from the value of the no-overtaking flag, the determination unit 38 sets an intermediate destination 300 at a position which is on the lane 200 that the vehicle 100 is traveling on and which allows the vehicle 100 to follow the preceding vehicle 101 without overtaking.

By changing the intermediate destination 300 to a position to follow the preceding vehicle 101 in this manner, no unnecessary candidate estimated paths 301 for overtaking are generated, thereby reducing the calculation load of the path estimation device 3.

An approach to calculate a time margin $T_{mrgn}$ in a case where the vehicle 100 overtakes the preceding vehicle 101 with a constant acceleration will be described.

The first calculation unit 36 calculates branch-arrival time $T_{lim}$ using the following equation (13).

Next, the first calculation unit 36 uses the following equation (14) to calculate a lower limit value $T_{lower}$ which is the time required for the vehicle 100 to travel at a constant acceleration and overtakes the preceding vehicle 101 to enter between the preceding vehicle 101 and the vehicle 102 ahead of the preceding vehicle.

Subsequently, the first calculation unit 36 calculates a time margin $T_{mrgn}$ for overtaking in accordance with the above equations (3) to (5) using the branch-arrival time $T_{lim}$ and the lower limit value $T_{lower}$.

In the following equations (13) and (14), $\alpha_{ego}$ denotes the acceleration (constant) of the vehicle 100, $V_{ego}$ denotes the current velocity of the vehicle 100, and $V_{lim}$ denotes a speed limit of a road on which the vehicle 100 is traveling. In this manner, even when the vehicle 100 accelerates to overtake the preceding vehicle 101, it is possible to calculate the time margin $T_{mrgn}$ for overtaking.

$T_{upper}$ and the lower limit value $T_{lower}$ as the time margin $T_{mrgn}$. This allows the time margin $T_{mrgn}$ to be obtained by simple calculation.

In the path estimation device 3 according to the first embodiment, the second calculation unit 37 compares the standard time $T_{ot}$ and the time margin $T_{mrgn}$, and in a case where the two match, weighting for the two are calculated and weighting is performed such that the cost of the lane on which the vehicle 100 is traveling and the cost of the adjacent lane become equal. In a case where the time margin $T_{mrgn}$ is shorter than the standard time $T_{ot}$, the second calculation unit 37 calculates weighting of the two and performs weighting such that the cost of the lane on which the vehicle 100 is traveling becomes lower than the cost of the adjacent lane. In a case where the time margin $T_{mrgn}$ is longer than the standard time $T_{ot}$, the second calculation unit 37 calculates weighting of the two and performs weighting such that the cost of the lane on which the vehicle 100 is traveling becomes higher than the cost of the adjacent lane. This enables control of the likelihood for a candidate estimated path 301 to be selected, depending on the length of the time margin $T_{mrgn}$.

In the path estimation device 3 according to the first embodiment, the first calculation unit 36 calculates the time margin $T_{mrgn}$ on the assumption that the vehicle 100 is traveling at a constant speed or a constant acceleration.

$$T_{lim} = \begin{cases} \dfrac{\sqrt{V_{ego}^2 + 2a_{ego}R_b} - V_{ego}}{a_{ego}} & \left(\text{in a case where } T_{lim} \le \dfrac{V_{lim} - V_{ego}}{a_{ego}}\right) \\ \dfrac{2a_{ego}R_b + V_{lim}^2 - V_{ego}^2}{2a_{ego}(V_{lim} + V_{ego})} & \left(\text{in a case where } T_{lim} > \dfrac{V_{lim} - V_{ego}}{a_{ego}}\right) \end{cases} \quad (13)$$

$$T_{lower} = \begin{cases} \dfrac{\sqrt{(V_{ego} - V_{p1})^2 + 2a_{ego}(R_1 + TH_{R1})} - (V_{ego} - V_{p1})}{a_{ego}} & \left(\text{in a case where } T_{lower} \le \dfrac{V_{lim} - V_{ego}}{a_{ego}}\right) \\ \dfrac{2a_{ego}(R_1 + TH_{R1}) + (3V_{ego} - V_{lim})(V_{lim} - V_{ego})}{2a_{ego}(V_{lim} + V_{ego} - V_{p1})} & \left(\text{in a case where } T_{lower} > \dfrac{V_{lim} - V_{ego}}{a_{ego}}\right) \end{cases} \quad (14)$$

As described above, in the path estimation device 3 according to the first embodiment, a plurality of candidate estimated paths 301 on which the vehicle 100 travels to the intermediate destination 300 while a moving object present by estimation time is avoided is generated depending on cost information of lanes, and an estimated path selected from the plurality of candidate estimated paths 301 is set as a path of the vehicle 100 for each estimation time.

With this configuration, a path of the vehicle 100 can be estimated depending on the situation around the vehicle. For example, when there is a margin when the vehicle 100 overtakes the preceding vehicle 101, a number of candidate estimated paths 301 are generated in the adjacent lane 201, whereas when there is no margin for overtaking, a number of candidate estimated paths 301 are generated in the lane 200. As a result, an estimated path can be efficiently selected depending on the situation around the vehicle.

Moreover, in the path estimation device 3 according to the first embodiment, the first calculation unit 36 sets a shorter one of the branch-arrival time $T_{lim}$ and the space-securing time $T_{space}$ as an upper limit value $T_{upper}$, and the time required for the vehicle 100 to overtake the preceding vehicle 101 and to enter between the preceding vehicle 101 and the vehicle 102 ahead of the preceding vehicle is set as a lower limit value $T_{lower}$. The first calculation unit 36 calculates the difference between the upper limit value With the speed of the vehicle 100 being constant, the time margin $T_{mrgn}$ can be obtained by simple calculation.

Also, in a case where the vehicle 100 accelerates to overtake the preceding vehicle 101, the time margin $T_{mrgn}$ for overtaking can be calculated.

In the path estimation device 3 according to the first embodiment, the determination unit 38 determines the intermediate destination 300 to be located at a position behind the preceding vehicle 101 such that the vehicle 100 follows the preceding vehicle 101 when the time margin is zero or negative.

No unnecessary candidate estimated paths 301 for overtaking are generated since the intermediate destination 300 is changed to a position to follow the preceding vehicle 101 when the vehicle 100 cannot overtake the preceding vehicle 101, and thus the calculation load of the path estimation device 3 can be reduced.

In the path estimation device 3 according to the first embodiment, the estimated path setting unit 39 generates candidate estimated paths 301 by repeatedly calculating, for each time step up to estimation time, the state of the vehicle 100 at a following time step by setting a vehicle control value to the state of the vehicle 100 at a previous time step. As a result, a candidate estimated path 301 can be efficiently generated using the state of the vehicle 100 at the previous time step.

In the path estimation device 3 according to the first embodiment, the second calculation unit 37 calculates the cost for an estimated position of the vehicle 100 at each time step estimated by the estimated path setting unit 39. The estimated path setting unit 39 generates a candidate estimated path, which is connected from an estimated position having a low cost calculated by the second calculation unit 37 among estimated positions of the vehicle 100 at a previous time step to an estimated position of the vehicle 100 at a following time step. As a result, a candidate estimated path 301 corresponding to the situation around the vehicle can be generated.

In the path estimation device 3 according to the first embodiment, the estimated path setting unit 39 generates candidate estimated paths by repeatedly calculating, for each time step up to estimation time from a selected time step, the state of the vehicle 100 at a following time step by setting a vehicle control value to the state of the vehicle 100 at a previous time step. As a result, a candidate estimated path 301 corresponding to the situation around the vehicle can be generated.

In the path estimation device 3 according to the first embodiment, the estimated path setting unit 39 selects, as an estimated path of the vehicle 100, a candidate estimated path 301 having the smallest total sum of costs of all nodes 302 (estimated positions) from among a plurality of candidate estimated paths 301. This enables control of the likelihood for a candidate estimated path 301 to be selected, depending on the cost of the nodes 302.

In the path estimation device 3 according to the first embodiment, the second calculation unit 37 sets a lower cost as an estimated position of the vehicle 100 at the end of a path or an estimated position of the vehicle 100 closest to the intermediate destination 300 among a plurality of candidate estimated paths 301 is closer to the intermediate destination 300. The estimated path setting unit 39 selects, as an estimated path of the vehicle 100, a candidate estimated path 301 having the smallest total sum of the costs of all estimated positions from among the plurality of candidate estimated paths 301.

This facilitates selection of a candidate estimated path 301 that does not deviate from the lane.

In the path estimation device 3 according to the first embodiment, the second calculation unit 37 sets a lower cost as the estimated position of the vehicle 100 is closer to the center line of the lane in the plurality of candidate estimated paths 301. The estimated path setting unit 39 selects, as an estimated path of the vehicle 100, a candidate estimated path 301 having the smallest total sum of the costs of all estimated positions from among the plurality of candidate estimated paths 301. This facilitates selection of a candidate estimated path 301 that does not deviate from the lane.

In the path estimation device 3 according to the first embodiment, the second calculation unit 37 sets a lower cost as an estimated speed of the vehicle 100 at an estimated position of the vehicle 100 on a candidate estimated path 301 is closer to a recommended speed. The estimated path setting unit 39 selects, as an estimated path of the vehicle 100, a candidate estimated path 301 having the smallest total sum of the costs of all estimated positions from among the plurality of candidate estimated paths 301. This facilitates selection of a candidate estimated path 301 that has less variation in the speed of the vehicle 100.

In the path estimation device 3 according to the first embodiment, the second calculation unit 37 sets a higher cost as an estimated position of the vehicle 100 is closer to an estimated position of a moving object. The estimated path setting unit 39 selects, as an estimated path of the vehicle 100, a candidate estimated path 301 having the smallest total sum of the costs of all estimated positions from among the plurality of candidate estimated paths 301. This facilitates selection of a candidate estimated path 301 on which the vehicle 100 avoids the moving object.

Second Embodiment

Figure 15:
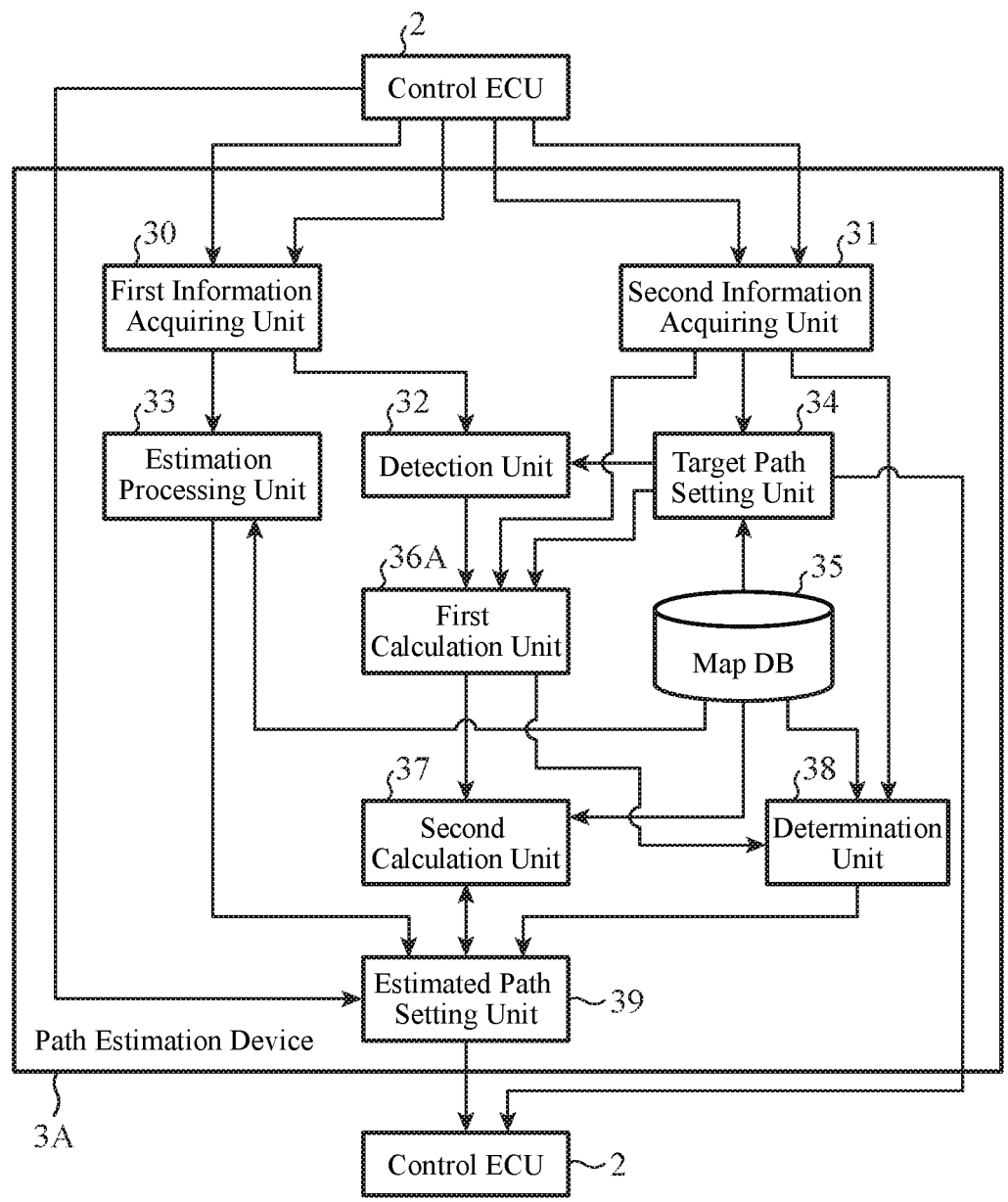
FIG. 15 is a block diagram illustrating a functional configuration of a path estimation device according to a second embodiment of the present invention.

FIG. 15 is a block diagram illustrating a functional configuration of a path estimation device 3A according to a second embodiment of the present invention. In FIG. 15, the same component as that in FIG. 2 is denoted with the same symbol and descriptions thereof are omitted. The path estimation device 3A is mounted on a vehicle and sequentially estimates a path for the vehicle to be travelling on for each estimation time several seconds ahead. As illustrated in FIG. 15, the path estimation device 3A includes a first information acquiring unit 30, a second information acquiring unit 31, a detection unit 32, an estimation processing unit 33, a target path setting unit 34, a map DB 35, a first calculation unit 36A, a second calculation unit 37, a determination unit 38, and an estimated path setting unit 39.

The first calculation unit 36A acquires information of the state of the vehicle acquired by the second information acquiring unit 31, information of the state of a preceding vehicle detected by the detection unit 32, information of the state of a vehicle ahead of the preceding vehicle, and information of the state of an adjacent-lane vehicle. An adjacent-lane vehicle refers to a vehicle that travels on an adjacent lane ahead of the vehicle and is closest to the vehicle.

The first calculation unit 36A further calculates a time margin $T_{mrgn}$ for the vehicle to overtake the preceding vehicle on the basis of the information of the states of the vehicle, the preceding vehicle, the vehicle ahead of the preceding vehicle, and the adjacent-lane vehicle.

Note that the states of these vehicles include the current position and the speed of the vehicles (speed in a direction along a target path).

Figure 16:
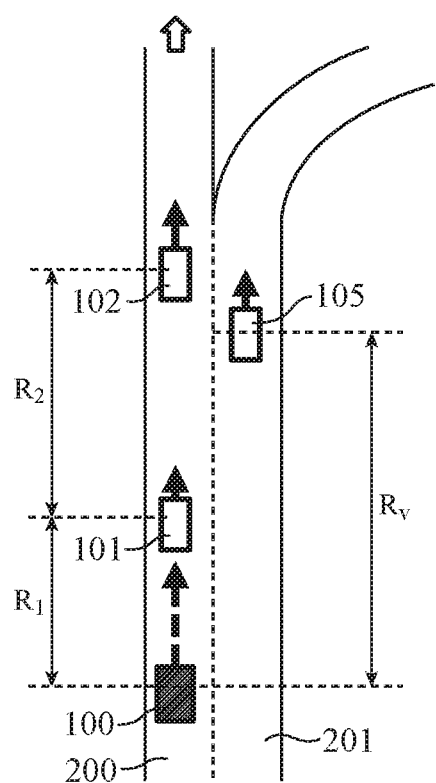
FIG. 16 is a diagram illustrating the positional relationship among a vehicle, a preceding vehicle, a vehicle ahead of the preceding vehicle, and an adjacent-lane vehicle, traveling on a road having a branch.

FIG. 16 is a diagram illustrating the positional relationship among a vehicle 100, a preceding vehicle 101, a vehicle 102 ahead of the preceding vehicle, and an adjacent-lane vehicle 105, traveling on a road having a branch.

In FIG. 16, the vehicle 100 includes the components illustrated in FIG. 1 and is mounted with the path estimation device 3A. A lane 200 on which the vehicle 100 is traveling is a lane leading to the final destination, and an adjacent lane 201 is a lane leading to the branch. The preceding vehicle 101 is traveling in front of the vehicle 100 on the lane 200, and the vehicle 102 ahead of the preceding vehicle is traveling in front of the preceding vehicle 101 on the lane 200. The adjacent-lane vehicle 105 travels on the adjacent lane 201 ahead of the vehicle 100 and is closest to the vehicle 100.

The first calculation unit 36A substitutes a branch-arrival distance Rb included in target path information and a velocity $V_{ego}$ of the vehicle 100 included in information of the state of the vehicle 100 into the above equation (1) to calculate branch-arrival time $T_{lim}$, which is time required for the vehicle 100 to reach the branch.

Next, the first calculation unit 36A substitutes an inter-vehicle distance $R_1$ between the vehicle 100 and the preceding vehicle 101, a separation distance $TH_{R1}$ of the vehicle 100 from the preceding vehicle 101, and the velocity $V_{p1}$ of the preceding vehicle 101 into the above equation (2) to calculate the time required for the vehicle 100 to complete overtaking of the preceding vehicle 101. This time becomes the lower limit value $T_{lower}$ also in the second embodiment.

The first calculation unit 36A calculates space-securing time $T_{space}$ by substituting an inter-vehicle distance $R_2$ between the preceding vehicle 101 and the vehicle 102 ahead of the preceding vehicle, an inter-vehicle distance $TH_{R2}$ between the preceding vehicle 101 and the vehicle 102 ahead of the preceding vehicle, the velocity $V_{p1}$ of the preceding vehicle 101, and a velocity $V_{p2}$ of the vehicle 102 ahead of the preceding vehicle into the above equation (3).

Next, the first calculation unit 36A calculates time $T_{next}$ (hereinafter, referred to as adjacent-vehicle arrival time) required for the vehicle 100 to catch up with the adjacent-lane vehicle 105 from the following equation (15).

In the following equation (15), $R_v$ denotes the inter-vehicle distance between the vehicle 100 and the adjacent-lane vehicle 105, $V_{ego}$ denotes the velocity of the vehicle 100, and $V_n$ denotes the velocity of the adjacent-lane vehicle 105. These velocities are a speed in a direction along a target path.

A separation distance $TH_{Rv}$ between the vehicle 100 and the adjacent-lane vehicle 105 is a distance that the two vehicles can approach closest to each other when the vehicle 100 changes lanes to the adjacent lane 201 to overtake the preceding vehicle 101 and is a value obtained empirically.

Subsequently, the first calculation unit 36A determines the shortest one of the branch-arrival time $T_{lim}$, the space-securing time $T_{space}$, and the adjacent-vehicle arrival time $T_{next}$ as the upper limit value $T_{upper}$ in accordance with the following equation (16).

$$T_{next} = \frac{(R_v - TH_{Rv})}{(V_{ego} - V_n)} \quad (15)$$

$$T_{upper} = \min(T_{lim}, T_{space}, T_{next}) \quad (16)$$

When the lower limit value $T_{lower}$ and the upper limit value $T_{upper}$ are determined, the first calculation unit 36A calculates the difference between the upper limit value $T_{upper}$ and the lower limit value $T_{lower}$ as the time margin $T_{mrgn}$ for the vehicle 100 to overtake the preceding vehicle 101 in accordance with the above equation (5).

The above time margin $T_{mrgn}$ is a time margin for the vehicle 100 to overtake the preceding vehicle 101 while keeping a distance from the adjacent-lane vehicle 105.

Note that the first calculation unit 36A may calculate the branch-arrival time $T_{lim}$ and the lower limit value $T_{lower}$ using the above equations (13) and (14) to calculate the time margin $T_{mrgn}$ for the case where the vehicle 100 overtakes the preceding vehicle 101 at a constant acceleration while the vehicle 100 keeps a distance from the adjacent-lane vehicle 105.

Although the path estimation device 3A mounted on the vehicle 100 is illustrated in FIG. 15, the second embodiment is not limited to this configuration.

For example, the path estimation device 3A may be a component included in a server device capable of wirelessly communicating with the control ECU 2 of the vehicle 100 via the wireless communication device 4.

In this case, information necessary for the path estimation of the vehicle 100 is transmitted from the vehicle 100 to the server device via the wireless communication device 4, and the path estimation device 3A included in the server device determines an estimated path of the vehicle 100 on the basis of the information received from the vehicle 100.

The estimated path information of the vehicle 100 is transmitted from the server device to the vehicle 100, and the control ECU 2 of the vehicle 100 sets the path indicated by the estimated path information received from the server device as the path of the vehicle 100.

Although FIG. 15 illustrates that the path estimation device 3A includes the first information acquiring unit 30, the second information acquiring unit 31, the detection unit 32, the estimation processing unit 33, the target path setting unit 34, the map DB 35, the first calculation unit 36A, the second calculation unit 37, the determination unit 38, and the estimated path setting unit 39, the second embodiment is not limited to this configuration.

For example, the target path setting unit 34 and the map DB 35 may be components included in an external device capable of communicating via the wireless communication device 4, and the first information acquiring unit 30, the second information acquiring unit 31, and the detection unit 32 may be components included in the control ECU 2.

In this case, the path estimation device 3A receives map information and target path information from the external device via the wireless communication device 4 and acquires information of the state around the vehicle, information of the state of the vehicle 100, information of the state of the preceding vehicle 101, information of the state of the vehicle 102 ahead of the preceding vehicle, and information of the state of the adjacent-lane vehicle 105 from the control ECU 2.

That is, in the second embodiment, the path estimation device 3A may not include the first information acquiring unit 30, the second information acquiring unit 31, the detection unit 32, the target path setting unit 34, and the map DB 35.

As described above, in the path estimation device 3A according to the second embodiment, the first calculation unit 36A calculates the time margin $T_{mrgn}$ on the basis of the information of the states of the vehicle 100, the preceding vehicle 101, the vehicle 102 ahead of the preceding vehicle, and the adjacent-lane vehicle 105.

This enables calculation of the time margin $T_{mrgn}$ for the case where the vehicle 100 overtakes the preceding vehicle 101 while keeping a distance from the adjacent-lane vehicle 105.

Note that the present invention is not limited to the above embodiments, and the present invention may include a flexible combination of the individual embodiments, a modification of any component of the individual embodiments, or omission of any component in the individual embodiments within the scope of the present invention.

INDUSTRIAL APPLICABILITY

A path estimation device according to the present invention is capable of estimating a path for a vehicle depending on the situation around the vehicle, and thus is applicable to automatic driving vehicles, for example.

REFERENCE SIGNS LIST

1: Group of sensors, 1a: speed sensor, 1b: Steering angle sensor, 1c: Accelerator sensor, 1d: Brake sensor, 1e: Acceleration sensor, 1f: Angular velocity sensor, 1g: GPS device, 1h: External camera, 1i: External sensor, 2: Control ECU, 2a, 3a: Processor, 2b, 3b: ROM, 2c, 3c: RAM, 2d: Engine, 2e: Transmission, 2f: Brake actuator, 2g: Steering actuator, 3, 3A: Path estimation device, 4: Wireless communication device, 4a: Antenna, 4b: Transmission unit, 4c: Reception unit, 30: First information acquiring unit, 31: Second information acquiring unit, 32: Detection unit, 33: Estimation processing unit, 34: Target path setting unit, 35: Map DB, 36, 36A: First calculation unit, 37: Second calculation unit, 38: Determination unit, 39: Estimated path setting unit, 100, 103, 104: Vehicle, 101: Preceding vehicle, 102: Vehicle ahead of a preceding vehicle, 105: Adjacent-lane vehicle, 200: Lane, 201: Adjacent lane, 300: Intermediate destination, 301: Candidate estimated path, 301A, 301A-1: Additional tree, 302: Node, 400: Certain range.

The invention claimed is:

1. A path estimation device comprising:
processing circuitry performing a process:
to calculate an estimated position of a moving object at each of time steps up to estimation time which is sequentially set from a current time on a basis of information of a state of the moving object present around a vehicle;
to calculate a time margin for the vehicle traveling on a target path to overtake a preceding vehicle of the vehicle on a basis of information of a state of the vehicle, target path information to a final destination, and information of a state of each of the preceding vehicle and a vehicle ahead of the preceding vehicle;
to calculate weighting for a cost of each of a lane on which the vehicle is traveling and an adjacent lane and performs weighting depending on a length of the time margin calculated by the process;
to determine an intermediate destination, which is a position of the vehicle at the estimation time, for each estimation time; and
to generate a plurality of candidate estimated paths, which leads the vehicle to the intermediate destination while avoiding the moving object present by the estimation time, depending on cost information of lanes on a basis of cost information of the lanes weighted by the process, position information of the intermediate destination determined by the process, and estimated position information of the moving object calculated by the process and setting an estimated path selected from the plurality of candidate estimated paths as a path of the vehicle for each estimation time.

2. The path estimation device according to claim 1, wherein the process sets, as an upper limit value, shorter one of branch-arrival time for the vehicle to arrive at a branch on the target path and space-securing time during which a space allowing the vehicle to enter between the preceding vehicle and the vehicle ahead of the preceding vehicle is secured and sets, as a lower limit value, time required for the vehicle to overtake the preceding vehicle and to enter between the preceding vehicle and the vehicle ahead of the preceding vehicle and calculates a difference between the upper limit value and the lower limit value as the time margin.

3. The path estimation device according to claim 2, wherein the process determines the intermediate destination at a position behind the preceding vehicle such that the vehicle follows the preceding vehicle in a case where the time margin is zero or negative.

4. The path estimation device according to claim 1, wherein the process compares standard time required for the vehicle to overtake the preceding vehicle with the time margin,
in a case where the two match, the process performs weighting such that the cost of the lane on which the vehicle is traveling equals the cost of the adjacent lane,
in a case where the time margin is shorter than the standard time, the process performs weighting such that the cost of the lane on which the vehicle is traveling becomes lower than the cost of the adjacent lane, and
in a case where the time margin is longer than the standard time, the process performs weighting such that the cost of the lane on which the vehicle is traveling becomes higher than the cost of the adjacent lane.

5. The path estimation device according to claim 1, wherein the process calculates the time margin assuming that the vehicle is traveling at a constant speed or a constant acceleration.

6. The path estimation device according to claim 1, wherein the process calculates the time margin on a basis of the information of the state of the vehicle, the information of the state of the preceding vehicle, the information of the state of the vehicle ahead of the preceding vehicle, and information of a state of a vehicle in an adjacent lane which is traveling ahead of the vehicle on the adjacent lane and is closest to the vehicle.

7. The path estimation device according to claim 1, wherein the process generates each of the plurality of candidate estimated paths by repeatedly calculating, for each of the time steps up to the estimation time, a state of the vehicle at a following time step by setting a vehicle control value to a state of the vehicle at a previous time step.

8. The path estimation device according to claim 7, wherein the process calculates a cost for an estimated position of the vehicle for each of the time steps estimated by the process, and
the process generates a candidate estimated path that connects to an estimated position of the vehicle at a following time step from an estimated position having a low cost calculated by the process among estimated positions of the vehicle at previous time steps.

9. The path estimation device according to claim 8, wherein the process selects, as an estimated path of the vehicle, a candidate estimated path having a smallest total sum of costs of all estimated positions from among the plurality of candidate estimated paths.

10. The path estimation device according to claim 8, wherein the process sets a lower cost as an estimated position of the vehicle at an end of a path or an estimated position of the vehicle closest to the intermediate destination is closer to the intermediate destination in the plurality of candidate estimated paths, and
the process selects, as an estimated path of the vehicle, a candidate estimated path having a smallest total sum of costs of all estimated positions from among the plurality of candidate estimated paths.

11. The path estimation device according to claim 8, wherein the process sets a lower cost as an estimated position of the vehicle is closer to a center line of a lane in the plurality of candidate estimated paths, and
the process selects, as an estimated path of the vehicle, a candidate estimated path having a smallest total sum of costs of all estimated positions from among the plurality of candidate estimated paths.

12. The path estimation device according to claim 8, wherein the process sets a lower cost as an estimated speed of the vehicle at an estimated position of the vehicle on a candidate estimated path is closer to a recommended speed, and
the process selects, as an estimated path of the vehicle, a candidate estimated path having a smallest total sum of costs of all estimated positions from among the plurality of candidate estimated paths.

13. The path estimation device according to claim 8,
wherein the process sets a higher cost as an estimated position of the vehicle is closer to an estimated position of the moving object, and the process selects, as an estimated path of the vehicle, a candidate estimated path having a smallest total sum of costs of all estimated positions from among the plurality of candidate estimated paths.

14. The path estimation device according to claim 7,
wherein the process generates each of the plurality of candidate estimated paths by repeatedly calculating, for each of the time steps up to the estimation time from a selected time step, a state of the vehicle at a following time step by setting a vehicle control value to a state of the vehicle at a previous time step.

15. A path estimation method comprising:

calculating an estimated position of a moving object at each of time steps up to estimation time which is sequentially set from a current time on a basis of information of a state of the moving object present around a vehicle;

calculating a time margin for the vehicle traveling on a target path to overtake a preceding vehicle of the vehicle on a basis of information of a state of the vehicle, target path information to a final destination, and information of a state of each of the preceding vehicle and a vehicle ahead of the preceding vehicle;

calculating weighting for a cost of each of a lane on which the vehicle is traveling and an adjacent lane and performs weighting depending on a length of the time margin calculated;

determining an intermediate destination, which is a position of the vehicle at the estimation time, for each estimation time; and generating a plurality of candidate estimated paths, which leads the vehicle to the intermediate destination while avoiding the moving object present by the estimation time, depending on cost information of lanes on a basis of cost information of the lanes weighted, position information of the intermediate destination determined, and estimated position information of the moving object calculated and setting an estimated path selected from the plurality of candidate estimated paths as a path of the vehicle for each estimation time.

\* \* \* \* \*